United States Patent [19]
Komiya et al.

[11] Patent Number: 5,912,289
[45] Date of Patent: Jun. 15, 1999

[54] AROMATIC POLYCARBONATE COMPOSITION HAVING IMPROVED THERMAL STABILITY, AND METHOD FOR PRODUCING THE SAME

[75] Inventors: Kyosuke Komiya; Hiroshi Hachiya, both of Kurashiki, Japan

[73] Assignee: Asahi Kasei Kogyo Kabushiki Kaisha, Osaka, Japan

[21] Appl. No.: 08/788,167

[22] Filed: Jan. 24, 1997

[30] Foreign Application Priority Data

Jan. 25, 1996 [JP] Japan .................................. 8-011178

[51] Int. Cl.$^6$ ........................................................ C08K 5/51
[52] U.S. Cl. .................. 524/153; 524/100; 524/107; 524/114; 524/119; 524/151; 524/152; 524/121; 524/128; 524/304; 524/414; 524/417
[58] Field of Search ...................... 524/151, 152, 524/153, 120, 121, 128, 119, 100, 109, 114, 304, 414, 417; 528/204, 307

[56] References Cited

U.S. PATENT DOCUMENTS

| | | |
|---|---|---|
| 4,831,105 | 5/1989 | Schissel . |
| 4,920,200 | 4/1990 | Brunelle et al. .................. 528/204 |
| 4,994,547 | 2/1991 | Brunelle et al. . |
| 5,401,826 | 3/1995 | Sakashita et al. . |
| 5,405,934 | 4/1995 | Oshino et al. . |
| 5,470,940 | 11/1995 | Otani et al. . |
| 5,625,025 | 4/1997 | Kuze et al. . |

FOREIGN PATENT DOCUMENTS

| | | |
|---|---|---|
| 1-331124 | 2/1989 | Japan ..................................... 528/204 |
| 415222 | 1/1992 | Japan . |
| 8-104748 | 4/1996 | Japan . |

OTHER PUBLICATIONS

The Condensed Chemical Dictionary–10th edition (1981) pp. 88 and 872, ed. Hawley, Van Nostrand Reinhold Co. Pub., 1981.

*Primary Examiner*—Veronica P. Hoke
*Attorney, Agent, or Firm*—Birch, Stewart, Kolasch & Birch, LLP

[57] ABSTRACT

Disclosed is a thermally stable aromatic polycarbonate composition comprising an aromatic polycarbonate, which is substantially free of a chlorine-containing compound, and a thermal stabilizer, the aromatic polycarbonate comprising a plurality of aromatic polycarbonate chains, each comprising recurring aromatic carbonate units and having a terminal aryl carbonate group and a terminal hydroxyl group, wherein each recurring unit has a divalent aromatic or pyridylene group comprising one or more divalent constituent aromatic or pyridylene groups, and wherein the plurality of aromatic polycarbonate chains collectively contain at least one constituent aromatic or pyridylene group substituted with at least one methyl group in an amount of 0.0001 or less in terms of the molar ratio of the methyl group substituted constituent group or groups relative to all constituent groups in the aromatic polycarbonate chains.

12 Claims, 2 Drawing Sheets

5,912,289

AROMATIC POLYCARBONATE COMPOSITION HAVING IMPROVED THERMAL STABILITY, AND METHOD FOR PRODUCING THE SAME

BACKGROUND OF THE INVENTION

1. Field of the Invention

The present invention relates to an aromatic polycarbonate composition having improved thermal stability, and a method for producing the same. More particularly, the present invention is concerned with an aromatic polycarbonate composition comprising an aromatic polycarbonate and a thermal stabilizer, the aromatic polycarbonate comprising a plurality of aromatic polycarbonate chains, each comprising recurring aromatic carbonate units and having a terminal aryl carbonate group and a terminal hydroxyl group, wherein each recurring aromatic carbonate unit has a divalent aromatic or pyridylene group comprising one or more divalent constituent aromatic or pyridylene groups which are each independently unsubstituted or substituted with at least one substituent, and wherein the plurality of aromatic polycarbonate chains collectively contain at least one divalent constituent aromatic or pyridylene group substituted with at least one methyl group in an amount which is not greater than a specific value in terms of the molar ratio of the methyl group-substituted divalent constituent group or groups relative to all divalent constituent groups in the recurring units of the plurality of aromatic polycarbonate chains, the aromatic polycarbonate composition being substantially free of a chlorine-containing compound. The present invention is also concerned with a method for producing the above-mentioned aromatic polycarbonate composition. The aromatic polycarbonate composition of the present invention has excellent thermal stability at molding. Specifically, the aromatic polycarbonate composition of the present invention is advantageous not only in that it is improved with respect to the suppression of discoloration at high-temperature molding, but also in that when it is continuously injection-molded and the continuous molding is interrupted and then restarted, the occurrence of unfavorable phenomena, such as deposition of black spots (carbonized material waste), and development of brown streaks, uneven color and the like, can be effectively suppressed. Therefore, the aromatic polycarbonate composition of the present invention can be advantageously used in various fields of applications of aromatic polycarbonates, such as the use thereof as injection molding materials.

2. Prior Art

In recent years, polycarbonates have been widely used in various fields as engineering plastics which have excellent heat resistance, impact resistance and transparency.

However, aromatic polycarbonates have poor flowability. Therefore, in molding fields (such as injection molding) in which a molded article of an aromatic polycarbonate is required to have excellent surface finish and high transparency, the molding of an aromatic polycarbonate is generally performed at high temperatures. In addition, in recent years, aromatic polycarbonates are increasingly used as molding materials for precision molding which requires a precise transfer is of the configuration of a mold cavity inner wall to the surface of a molded article. Therefore, an aromatic polycarbonate which is suppressed with respect to the occurrence of discoloration even when the molding of the aromatic polycarbonate is conducted at a temperature as high as 350° C. or more, has been earnestly desired. Further, when a continuous injection molding of an aromatic polycarbonate is conducted, a problem arises such that not only do the molded articles tend to have poor appearance, but mold release characteristics are also poor, so that the continuous injection molding has to be frequently interrupted for cleaning the mold, as compared to a continuous injection molding of other types of resins. Moreover, even when the continuous injection molding is restarted after the cleaning of the mold, a problem arises such that unfavorable phenomena, such as deposition of black spots (carbonized material waste), and development of brown streaks, uneven color and the like, markedly occur in the resultant molded articles, and that these unfavorable phenomena continue to occur, so that a large number of poor molded articles are produced before good molded articles begin to be produced. Furthermore, even after steady production of good molded articles has begun again after the restart of the continuous injection molding, molded articles, actually, still sometimes suffer from unfavorable phenomena, such as deposition of black spots, which are fatal defects for injection-molded articles. Also, it is possible that the above-mentioned problems occurring at the restart of the molding after the interruption for cleaning the mold arise even when the molding is restarted after an interruption of the molding for lunch time or weekend, or after an interruption due to an accident to the molding machine or other troubles in the molding process. Therefore, it has been earnestly desired to solve the above-mentioned problems.

It is considered that, for avoiding the above-mentioned unfavorable phenomena, such as deposition of black spots and the like, it is effective to improve the thermal stability of an aromatic polycarbonate. Therefore, various attempts have conventionally been made to improve the thermal stability of an aromatic polycarbonate. However, conventional proposals have been unable to satisfactorily suppress the occurrence of the above-mentioned unfavorable phenomena. For example, for improving the thermal stability of an aromatic polycarbonate produced by the phosgene process (interfacial process), various types of thermal stabilizers, such as thermal stabilizers comprising a phosphorous triester, an epoxy compound, a hindered phenol or the like, have been proposed. By the use of such a thermal stabilizer, the thermal stability of an aromatic polycarbonate can be improved; however, conventionally, an aromatic polycarbonate composition has not been obtained which has advantages such that the occurrence of discoloration is suppressed even when the molding of the composition is performed at high temperatures, and that the occurrence of unfavorable phenomena, such as deposition of black spots, development of brown streaks, uneven color and the like, is suppressed even when the continuous molding of the composition is interrupted and restarted.

It is known that a polycarbonate produced by the phosgene process contains chlorine atoms in a large amount, which chlorine atoms adversely affect the thermal stability of the polycarbonate. It is also known that a polycarbonate produced by the transesterification process is substantially free of a chlorine atom. Recently, a large number of researches and developments have been made for improving the thermal stability of a polycarbonate produced by the transesterification process, especially the melt process.

For example, there have been proposed various melt process polycarbonate compositions, such as a composition comprising a polycarbonate obtained by the melt process using a catalyst containing an alkali metal and a nitrogen-containing compound, and a thermal stabilizer comprising a phosphorus compound, a phenolic compound or an epoxy compound (see Unexamined Japanese Patent Application Laid-Open Specification No. 4-36346); a composition comprising a polycarbonate obtained by the melt process, and a thermal stabilizer comprising a phosphate compound, a phosphonite compound, or a mixture of a phosphate compound and a hindered phenol thermal stabilizer (see Unexamined Japanese Patent Application Laid-Open Specification Nos. 4-15221, 4-15222 and 4-15223); a composition comprising a polycarbonate obtained by the melt process, and an acid phosphate (see Unexamined Japanese Patent Application Laid-Open Specification No. 5-112706); and a composition comprising a polycarbonate obtained by the melt process using a catalyst containing an alkali metal and a nitrogen-containing compound, and an acidic compound (see Examined Japanese Patent Application Publication No. 6-92529 corresponding to EF-A-O 435 124). However, the above-mentioned techniques cannot satisfactorily suppress the occurrence of unfavorable phenomena, such as deposition of black spots, and development of brown streaks, uneven color and the like, which unfavorable phenomena have conventionally been observed when the continuous molding of an aromatic polycarbonate composition is interrupted and restarted.

Also, for obtaining a polycarbonate having improved thermal stability, there have been proposals in which attention is paid to the amounts of trace substances contained in polycarbonates produced by the melt process. As examples of such proposals, the following prior art documents can be mentioned. Unexamined Japanese Patent Application Laid-Open Specification No. 5-148355 discloses a melt process polycarbonate containing, as trace substances, not more than 5 ppm of iron, not more than 1 ppm of sodium and less than 10 ppm of chlorine, and having a terminal hydroxyl group in an amount of not more than 20 mole %, based On the moles of all terminal groups. Unexamined Japanese Patent Application Laid-Open Specification No. 5-156000 discloses a melt process polycarbonate containing, as trace substances, not more than 1,000 ppm of phenol, not more than 1,000 ppm of a divalent hydroxy compound and not more than 2,000 ppm of a carbonic diester. Even by the above-mentioned techniques, however, it has not yet been achieved to obtain an aromatic polycarbonate composition which has advantages such that the occurrence of discoloration is suppressed even when the molding of the composition is performed at high temperatures, and that the occurrence of unfavorable phenomena, such as deposition of black spots, development of brown streaks, uneven color and the like, is suppressed even when the continuous molding of the composition is interrupted and restarted.

The task of the present invention is to provide an aromatic polycarbonate composition which is advantageous not only in that it is improved with respect to the suppression of discoloration at high-temperature molding, especially a molding performed at a temperature as high as 350° C. or more, but also in that when it is continuously injection-molded and the continuous molding of the composition is interrupted and restarted, the occurrence of unfavorable phenomena, such as deposition of black spots, and development of brown streaks, uneven color and the like, can be suppressed. As described hereinabove, such an excellent aromatic polycarbonate composition has conventionally not been known.

SUMMARY OF THE INVENTION

In this situation, the present inventors have made extensive and intensive studies with a view toward developing an aromatic polycarbonate composition which is advantageous not only in that it is improved with respect to the suppression of discoloration at high-temperature molding, especially a molding performed at a temperature as high as 350° C. or more, but also in that when it is continuously injection-molded and the continuous molding is interrupted and restarted, the occurrence of unfavorable phenomena, such as deposition of black spots, and development of brown streaks, uneven color and the like, can be suppressed, and a method for producing the same. As a result, it has unexpectedly been found that the above-mentioned objective can be achieved by an aromatic polycarbonate composition comprising an aromatic polycarbonate and a thermal stabilizer, the aromatic polycarbonate comprising a plurality of aromatic polycarbonate chains, each comprising recurring aromatic carbonate units and having a terminal aryl carbonate group and a terminal hydroxyl group, wherein each recurring aromatic carbonate unit has a divalent aromatic or pyridylene group comprising one or more divalent constituent aromatic or pyridylene groups which are each independently unsubstituted or substituted with at least one substituent, and wherein the plurality of aromatic polycarbonate chains collectively contain at least one divalent constituent aromatic or pyridylene group substituted with at least one methyl group in an amount which is not greater than a specific value in terms of the molar ratio of the methyl group-substituted divalent constituent group or groups relative to all divalent constituent groups in the recurring units of the plurality of aromatic polycarbonate chains, the aromatic polycarbonate composition being substantially free of a chlorine-containing compound. That is, the present inventors have unexpectedly found that the above-mentioned aromatic polycarbonate composition has excellent thermal stability at molding, and is advantageous not only in that it is improved with respect to the suppression of discoloration at high-temperature molding, but also in that when it is continuously injection-molded and the continuous molding is interrupted and then restarted, the occurrence of unfavorable phenomena, such as deposition of black spots (carbonized material waste), and development of brown streaks, uneven color and the like, can be effectively suppressed. By virtue of such excellent properties, the above-mentioned aromatic polycarbonate composition can be advantageously used in various fields of applications of aromatic polycarbonates, such as the use thereof as injection molding materials. It has also unexpectedly been found that the above-mentioned aromatic polycarbonate composition having excellent thermal stability at molding can easily be obtained by adding a thermal stabilizer to an aromatic polycarbonate obtained by reacting-a mixture of different aromatic dihydroxy compounds which contains, in an amount not greater than a specific value, an aromatic dihydroxy compound having a methyl group-substituted aromatic group with a diaryl carbonate. The present invention has been completed, based on these novel findings.

Therefore, it is an object of the present invention to provide an aromatic polycarbonate composition having excellent thermal stability at molding, which is advantageous not only in that it is improved with respect to the suppression of discoloration at high temperature molding, but also in that when it is continuously injection-molded and the continuous molding is interrupted and then restarted, the occurrence of unfavorable phenomena, such as deposition of black spots (carbonized material waste), and development of brown streaks, uneven color and the like, can be effectively suppressed.

Another object of the present invention is to provide a method for producing the above-mentioned aromatic polycarbonate composition having excellent thermal stability at molding.

The foregoing and other objects, features and advantages of the present invention will be apparent from the following detailed description taken in connection with the accompanying drawings.

Figure 1:
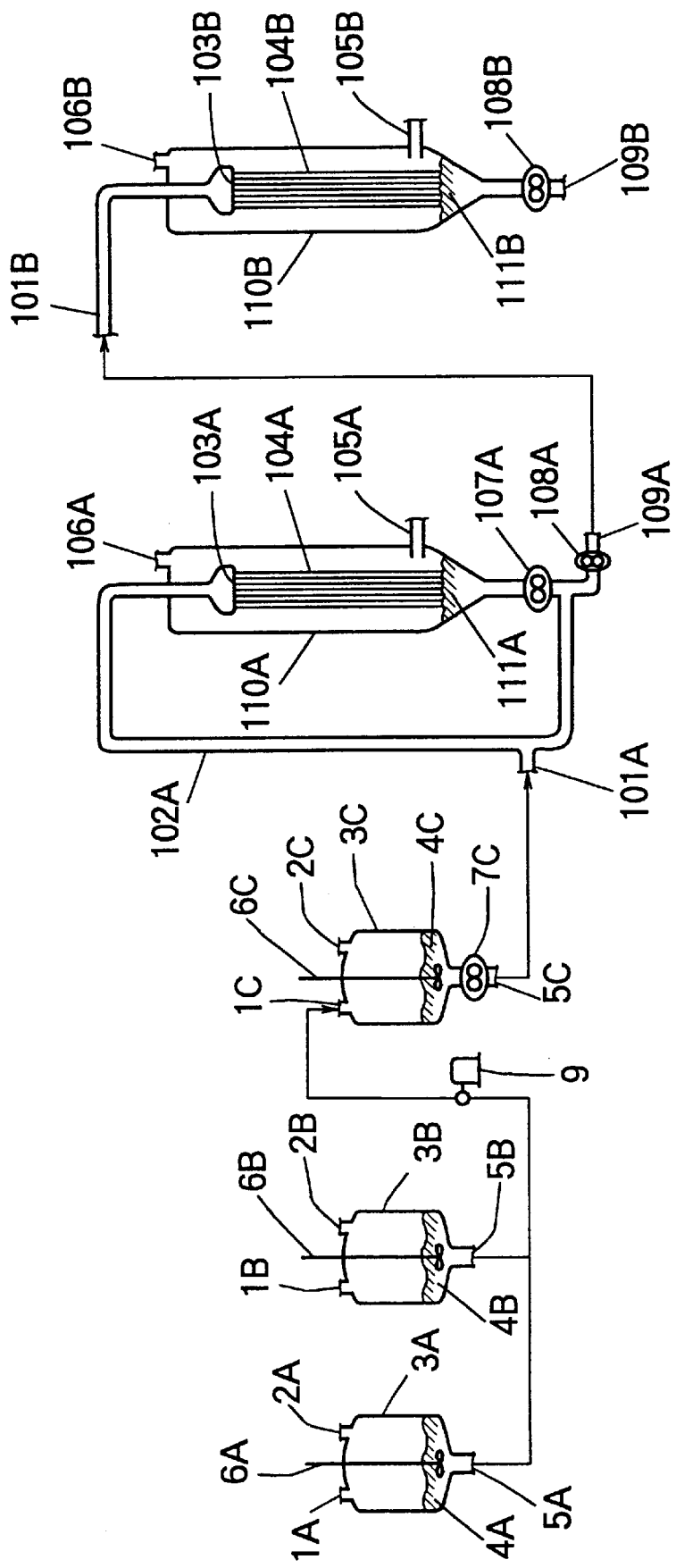
FIG. 1 is a diagram showing the system employed for producing an aromatic polycarbonate in Example 1.

Description of Reference Numerals (FIG. 1)
1A–6A: Numerals assigned in connection with first vertical agitation type Polymerizer vessel (A)
1B–6B: Numerals assigned in connection with first vertical agitation type polymerizer vessel (B)
1C–7C: Numerals assigned in connection with second vertical agitation type polymerizer vessel (C)
101A–111A: Numerals assigned in connection with first wire-wetting fall polymerizer
101B–111B: Numerals assigned in connection with second wire-wetting fall polymerizer
1A, 1B: Inlet for a starting material
1C: Inlet for a prepolymer
2A, 2B, 2C: Vet
3A, 3B: First vertical agitation type polymerizer vessels (A) and (B)
3C: Second vertical agitation type polymerizer vessel (C)
4A, 4B, 4C: Molten prepolymer
5A, 5B, 5C: Outlet
6A, 6B, 6C: Agitator
7C, 9: Transfer pump
101A, 101B: Inlet for a polymerizable material
102A: Recirculation line
103A, 103B: Perforated plate
104A, 104B: Wire
105A, 105B: Gas feed port
106A, 106B: Vent
107A: Recirculation pump
108A: Transfer pump
108B: Discharge pump
109A, 109B: Outlet
110A, 110B: Main body of were-wetting fall polymerizer
111A: Molten Prepolymer
111B: Molten Prepolymer (FIGS. 2 to 4)
103: Perforated plate
104: Wire
121: Role of a perforated plate
122: Fixation point of wire
123: Support rod for wire

DETAILED DESCRIPTION OF THE INVENTION

According to the present invention, there is provided an aromatic polycarbonate composition comprising:

(a) an aromatic polycarbonate comprising a plurality of aromatic polycarbonate chains, each comprising recurring units each independently represented by the following formula (1):

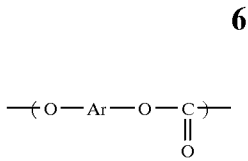

wherein Ar represents a divalent $C_6$–$C_{200}$ aromatic or pyridylene group comprising one or more divalent constituent $C_6$–$C_{30}$ aromatic or pyridylene groups which are each independently unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, wherein when the number of divalent constituent groups in the divalent aromatic or pyridylene group Ar is two or more, the divalent constituent aromatic or pyridylene groups are arranged in series on each aromatic polycarbonate chain and the mutually adjacent divalent constituent aromatic or pyridylene groups are connected to each other directly or through a bonding group, wherein the plurality of aromatic polycarbonate chains collectively contain, in the recurring units thereof at least one divalent constituent $C_6$–$C_{30}$ aromatic or pyridylene group substituted with at least one methyl group in an amount of 0.0001 or less in terms of the molar ratio of the methyl group-substituted divalent $C_5$–$C_{30}$ constituent group or groups relative to all divalent $C_5$–$C_{30}$ constituent groups in the recurring units of the plurality of aromatic polycarbonate chains, the aromatic polycarbonate having a weight average molecular weight of from 1,000 to 300,000, each of the plurality of aromatic polycarbonate chains having terminal groups which are each independently selected from the group consisting of a terminal aryl carbonate group and a terminal hydroxyl group, provided that the plurality of aromatic polycarbonate chains collectively contain a plurality of terminal aryl carbonate groups, wherein each of the terminal aryl carbonate groups is independently represented by the following formula (2);

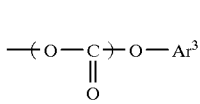

wherein $Ar^3$ represents a monovalent $C_6$–$C_{200}$ aromatic or pyridyl group which is unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, and (b) a thermal stabilizer, the aromatic polycarbonate composition being substantially free of a chlorine-containing compound.

For easy understanding of the present invention, the essential features and various embodiments of the present invention are enumerated below.

1. An aromatic polycarbonate composition comprising:

(a) an aromatic polycarbonate comprising a plurality of aromatic polycarbonate chains, each comprising recurring units each independently represented by the following formula (1):

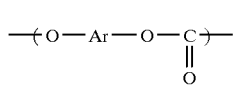

(1)

wherein Ar represents a divalent $C_6$–$C_{200}$ aromatic or pyridylene group comprising one or more divalent constituent $C_6$–$C_{30}$ aromatic or pyridylene groups which are each independently unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7C_{31}$ aralkyl group, wherein when the number of divalent constituent groups in the divalent aromatic or pyridylene group Ar is two or more, the divalent constituent aromatic or pyridylene groups are arranged in series on each aromatic polycarbonate chain and the mutually adjacent divalent constituent aromatic or pyridylene groups are connected to each other directly or through a bonding group, wherein the plurality of aromatic polycarbonate chains collectively contain, in the recurring units thereof, at least one divalent constituent $C_6$–$C_{30}$ aromatic or pyridylene group substituted with at least one methyl group in an amount 0.0001 or less in terms of the molar ratio of the methyl group-substituted divalent $C_5$–$C_{30}$ constituent group or groups relative to all divalent $C_5$–$C_{30}$ constituent groups in the recurring units of the plurality of aromatic polycarbonate chains, the aromatic polycarbonate having a weight average molecular weight of from 1,000 to 300,000, each of the plurality of aromatic polycarbonate chains having terminal groups which are each independently selected from the group consisting of a terminal aryl carbonate group and a terminal hydroxyl group, provided that the plurality of aromatic polycarbonate chains collectively contain a plurality of terminal aryl carbonate groups, wherein each of the terminal aryl carbonate groups is independently represented by the following formula (2):

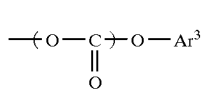

(2)

wherein $Ar^3$ represents a monovalent $C_6$–$C_{200}$ aromatic or pyridyl group which is unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, and (b) a thermal stabilizer, the aromatic polycarbonate composition being substantially free of a chlorine-containing compound.

2. The aromatic polycarbonate composition according to item 1 above, wherein the plurality of aromatic polycarbonate chains collectively have, in the plurality of terminal aryl carbonate groups thereof, at least one monovalent $C_6$–$C_{200}$ aromatic or pyridyl group substituted with at least one methyl group in an amount of 0.0002 or less in terms of the molar ratio of the methyl group-substituted monovalent group or groups relative to all monovalent groups in the plurality of terminal aryl carbonate groups of the plurality of aromatic polycarbonate chains.

3. The aromatic polycarbonate composition according to item 1 or 2 above, wherein the thermal stabilizer (b) comprises a phosphorus thermal stabilizer.

4. The aromatic polycarbonate composition according to item 3 above, wherein the phosphorus thermal stabilizer comprises at least one compound selected from the group consisting of a phosphorous monoester and a phosphorous diester.

5. The aromatic polycarbonate composition according to item 4 above, wherein the at least one member selected from the group consisting of the phosphorous monoester and the phosphorous diester is present in an amount of from 0.0002 to 0.015 part by weight, relative to 100 parts by weight of the aromatic polycarbonate.

6. A method for producing an aromatic polycarbonate composition, comprising:

providing an aromatic polycarbonate produced by transesterification of an aromatic dihydroxy compound represented by the following formula (3):

HO—$Ar^4$—OH  (3)

wherein $Ar^4$ represents a divalent $C_6$–$C_{200}$ aromatic or pyridylene group comprising one or more divalent constituent $C_6$–$C_{30}$ aromatic or pyridylene groups which are each independently unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7C_{31}$ aralkyl group, wherein when the number of divalent constituent groups in the divalent aromatic or pyridylene group $Ar^4$ is two or more, the divalent constituent aromatic or pyridylene groups are arranged in series on each aromatic polycarbonate chain and the mutually adjacent divalent constituent aromatic or pyridylene groups are connected to each other directly or through a bonding group, with a diaryl carbonate represented by the following formula (4):

(4)

wherein each of $Ar^5$ and $Ar^6$ independently represents a monovalent $C_6$–$C_{200}$ aromatic or pyridyl group which is unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, the aromatic dihydroxy compound of the formula (3) being a mixture of an aromatic dihydroxy compound represented by the following formula (5):

HO—$Ar^{4x}$—OH  (5)

wherein $Ar^{4x}$ represents a divalent $C_6$–$C_{200}$ aromatic or pyridylene group comprising one or more divalent constituent $C_6$–$C_{30}$ aromatic or pyridylene groups which are each independently unsubstituted or substituted with at least one substituent selected from the group consisting of a halogen atom, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, wherein when the number of divalent constituent groups in the divalent aromatic or pyridylene group $Ar^{4x}$ is two or more, the divalent constituent aromatic or pyridylene groups are arranged in series on each aromatic polycarbonate chain and the mutually adjacent divalent constituent aromatic or pyridylene groups are connected to each other directly or through a bonding group, and a methyl group-containing aromatic dihydroxy compound represented by the formula (6):

HO—$Ar^{4y}$—OH  (6)

wherein $Ar^{4y}$ represents a divalent $C_7$–$C_{200}$ aromatic or substituted pyridylene group comprising one or more divalent constituent $C_6$–$C_{30}$ aromatic or pyridylene groups which are each independently unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7C_{31}$ aralkyl group, provided that the divalent aromatic or pyridylene group $Ar^{4y}$ contains at least one divalent constituent aromatic or pyridylene group substituted with at least one methyl group, wherein when the number of divalent constituent groups in the divalent aromatic or pyridylene group $Ar^{4y}$ is two or more, the divalent constituent aromatic or pyridylene groups are arranged in series on each aromatic polycarbonate chain and the mutually adjacent divalent constituent aromatic or pyridylene groups are connected to each other directly or through a bonding group, the content of the methyl group-containing aromatic dihydroxy compound of the formula (6) in the mixture being 200 ppm by weight or less; and adding a thermal stabilizer to the aromatic polycarbonate.

7. The method according to item 6 above, wherein the diaryl carbonate represented by the formula (4) is a mixture of a diaryl carbonate represented by the following formula (7):

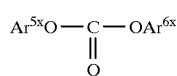  (7)

wherein each of $Ar^{5x}$ and $Ar^{6x}$ independently represents a monovalent $C_6$–$C_{200}$ aromatic or pyridyl group which is unsubstituted or substituted with at least one substituent selected from the group consisting of a halogen atom, a $C_2$–$C_{10}$ alkyl group, a $C_1$–$C_{10}$ alkoxy group, a $C_5C_{-10}$ cycloalkyl group, a $C_6$–$C_{30}$ aryl group and a $C_7$–$C_{31}$ aralkyl group, and a methyl group-containing diaryl carbonate represented by the formula (8):

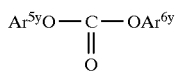  (8)

wherein each of $Ar^{5y}$ and $Ar^{6y}$ independently represents a monovalent $C_6$–$C_{200}$ aromatic or pyridyl group which is unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, provided that at least one of the monovalent aromatic or pyridyl groups $Ar^{5y}$ and $Ar^{6y}$ is substituted with at least one methyl group, the content of the methyl group-containing diaryl carbonate of the formula (8) in the mixture being 300 ppm by weight or less.

8. The method according to item 6 or 7 above, wherein the aromatic dihydroxy compound of the formula (5) is bisphenol A.

9. The method according to any one of item 6 or 7 above, wherein the phosphorus thermal stabilizer is added to the aromatic polycarbonate which is in the molten state upon the transesterification.

10. The method according to item 8 above, wherein the phosphorus thermal stabilizer is added to the aromatic polycarbonate which is in the molten state upon the transesterification.

11. A shaped article obtained from a material comprising an aromatic polycarbonate composition according to any one of items 1, 2, 4 and 5 above.

12. A shaped article obtained from a material comprising an aromatic polycarbonate composition according to item 3 above.

As mentioned above, the aromatic polycarbonate used in the aromatic polycarbonate composition of the present invention comprises a plurality of aromatic polycarbonate chains, each comprising recurring units each independently represented by the following formula (1):

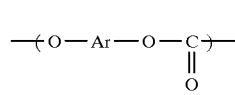  (1)

wherein Ar represents a divalent $C_6$–$C_{200}$ aromatic or pyridylene group comprising one or more divalent constituent $C_6$–$C_{30}$ aromatic or pyridylene groups which are each independently unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, wherein when the number of divalent constituent groups in the divalent aromatic or pyridylene group Ar is two or more, the divalent constituent aromatic or pyridylene groups are arranged in series on each aromatic polycarbonate chain and the mutually adjacent divalent constituent aromatic or pyridylene groups are connected to each other directly or through a bonding group.

The plurality of aromatic polycarbonate chains collectively contain, in the recurring units thereof, at least one divalent constituent $C_6$–$C_{30}$ aromatic or pyridylene group substituted with at least one methyl group in an amount of 0.0001 or less in terms of the molar ratio of the methyl group-substituted divalent $C_5$–$C_{30}$ constituent group or groups relative to all divalent $C_5$–$C_{30}$ constituent groups in the recurring units of the plurality of aromatic polycarbonate chains.

The aromatic polycarbonate has a weight average molecular weight of from 1,000 to 300,000.

Each of the plurality of aromatic polycarbonate chains has terminal groups which are each independently selected from the group consisting of a terminal aryl carbonate group and a terminal hydroxyl group, provided that the plurality of aromatic polycarbonate chains collectively contain a plurality of terminal aryl carbonate groups.

The aromatic dihydroxy compound to be used in producing the aromatic polycarbonate used in the aromatic polycarbonate composition of the present invention is represented by the following formula (3):

(3)

wherein $Ar^4$ represents a divalent $C_6$–$C_{200}$ aromatic or pyridylene group comprising one or more divalent constituent $C_6$–$C_{30}$ aromatic or pyridylene groups which are each independently unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cloalkyl group, a $C_6$–$C_{30}$ aryl group and a $C_7$–$C_{31}$ aralkyl group, wherein when the number of divalent constituent groups in the divalent aromatic or pyridylene group $Ar^4$ is two or more, the divalent constituent aromatic or pyridylene groups are arranged in series on each aromatic polycarbonate chain and the mutually adjacent divalent constituent aromatic or pyridylene groups are connected to each other directly or through a bonding group.

Examples of constituent aromatic or pyridylene groups in divalent aromatic or pyridylene group $Ar^4$ include phenylene, naphthylene and pyridylene which are unsubstituted or substituted with at least one substituent.

Further examples of aromatic or pyridylene groups $Ar^4$ include an aromatic or pyridylene group represented by the following formula (9):

$$—Ar^1—Y—Ar^2— \qquad (9)$$

wherein each of $Ar^1$ and $Ar^2$ independently represents a divalent constituent $C_6$–$C_{30}$ carbocyclic aromatic or $C_5$–$C_{30}$ heterocyclic group such as phenylene, naphthylene or pyridylene which is unsubstituted or substituted with at least one substituent as defined above; and Y represents a bonding group through which the mutually adjacent constituent aromatic or pyridylene groups are connected to each other.

The above-mentioned bonding group is an unsubstituted or substituted alkylene group represented by a formula selected from the following formulae (10) and (11):

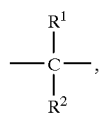

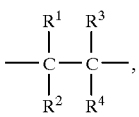

(10)

and

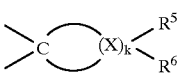

(11)

wherein each of $R^1$, $R^2$, $R^3$ and $R^4$ independently represents a hydrogen atom, an alkyl group having from 1 to 10 carbon atoms, an alkoxy group having from 1 to 10 carbon atoms, a cycloalkyl group having from 5 to 10 ring-forming carbon atoms, an aryl group having from 6 to 30 ring-forming carbon atoms and an aralkyl group having from 7 to 31 ring-forming carbon atoms; k represents an integer of from 3 to 11; each X represents a ring-forming carbon atom and has $R^5$ and $R^6$ bonded thereto; each $R^5$ independently represents a hydrogen atom or an alkyl group having from 1 to 6 carbon atoms, and each $R^6$ independently represents a hydrogen atom or an alkyl group having from 1 to 6 carbon atoms, wherein $R^5$ and $R^6$ are the same or different; and wherein at least one hydrogen atom of each of $R^1$, $R^2$, $R^3$, $R^4$, $R^5$ and $R^6$ may be replaced with a substituent which does not adversely affect the reaction, such as a halogen atom, an alkyl group having from 1 to 10 carbon atoms, an alkoxy group having from 1 to 10 carbon atoms, a cycloalkyl group having from 1 to 10 carbon atoms, an aryl group having from 6 to 30 carbon atoms, an aralkyl group having 7 to 31 carbon atoms, a phenoxy group having 6 to 20 carbon atoms, a vinyl group having 2 to 15 carbon atoms, a cyano group having 1 to 10 carbon atoms, an ester group having 2 to 15 carbon atoms, an amido group having 1 to 10 carbon atoms and/or a nitro group.

In the aromatic polycarbonate used in the present invention, further examples of divalent $C_6$–$C_{200}$ aromatic or pyridylene groups Ar include those which are represented by the following formula (12):

(12)

wherein $Ar^1$ and $Ar^2$ are as defined for the formula (9) above; and Z represents a single bond, or a divalent group, such as —O—, —Co—, —S—, —SO$_2$, —CO$_2$—, or —CON($R^1$)—, wherein $R^1$ is as defined above.

Each recurring unit of the aromatic carbonate chain may contain three or more divalent constituent $C_6$–$C_{30}$ aromatic or pyridylene groups arranged in series on the aromatic polycarbonate chain.

Specific examples of divalent aromatic or pyridylene groups usable in the present invention include groups respectively represented by the following formulae (13) and (14):

(13)

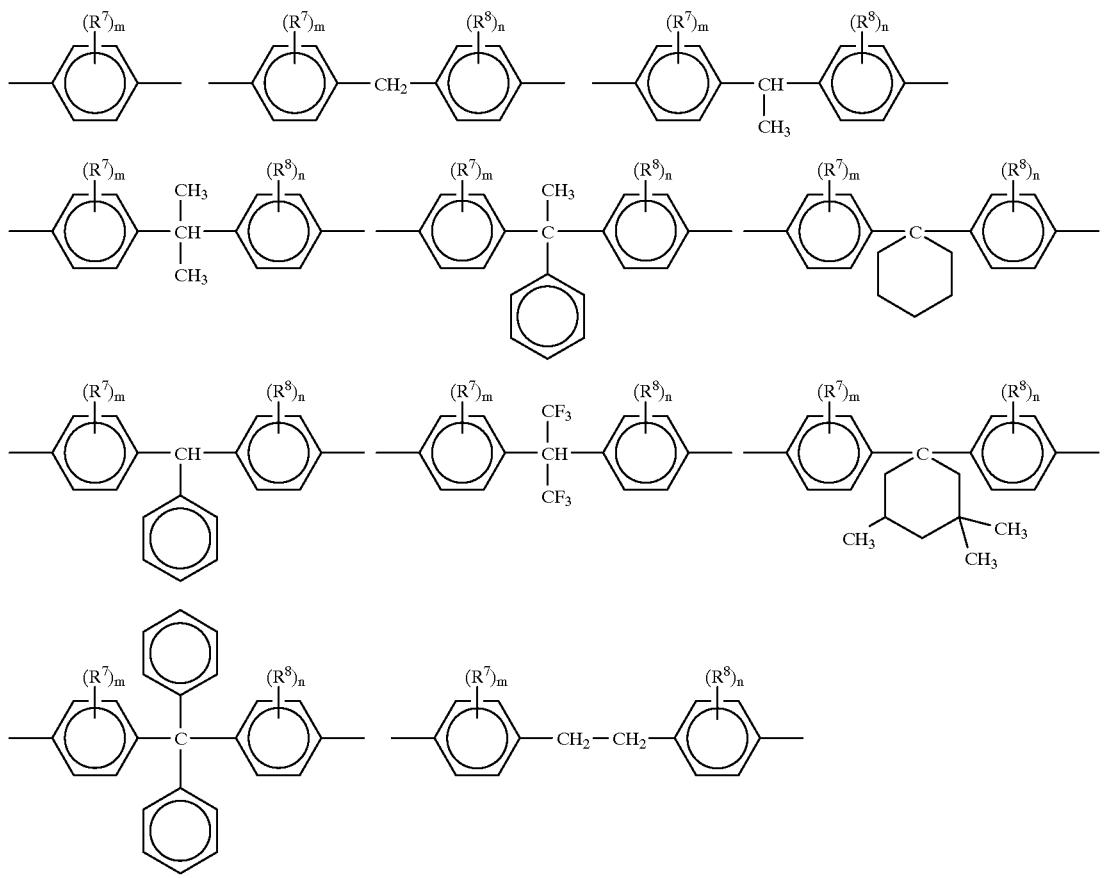

(14)

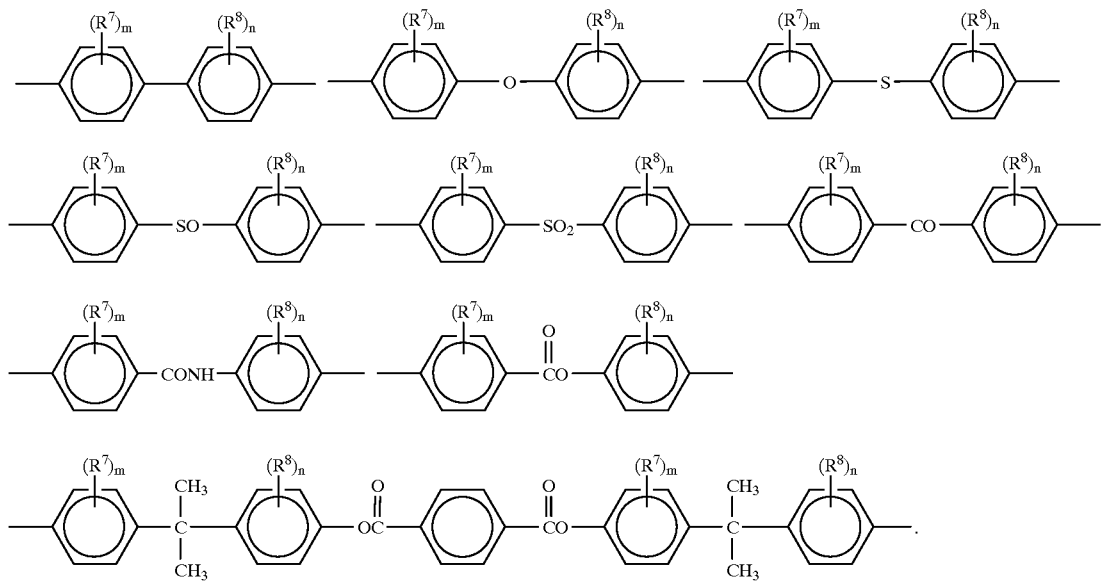

wherein each of $R^7$ and $R^6$ independently represents a halogen atom, an alkyl group having from 1 to 10 carbon atoms, an alkoxy group having from 1 to 10 carbon atoms, a cycloalkyl group having from 5 to 10 ring-forming carbon atoms, or an aryl group having from 6 to 30 ring-forming carbon atoms; each of m and n independently represents an integer of from 0 to 4, with the proviso that when m is an integer of from 2 to 4, $R^7$'s are the same or different, and when n is an integer of from 2 to 4, $R^8$'s are the same or different.

It should be noted that when each of $R^7$ and $R^8$ is a methyl group and each of m and n is not zero, there is a limitation with respect to the amounts of $Ar^1$ and $Ar^2$ of formulae (9) and (12) (with the proviso that when a condensed-ring aromatic group, such as a naphthylene group, is a constituent aromatic group, a single condensed-ring aromatic group is regarded as a single constituent aromatic group). Specifically, in the present invention, it is requisite that the plurality of aromatic polycarbonate chains collectively contain, in the recurring units thereof, at least one divalent constituent $C_6$–$C_{30}$ aromatic or pyridylene group substituted with at least one methyl group in an amount of 0.0001 or less, preferably 0.00004 or less, in terms of the molar ratio of the methyl group-substituted divalent $C_5$–$C_{30}$ constituent group or groups relative to all divalent $C_5$–$C_{30}$ constituent groups in the recurring units of the plurality of aromatic polycarbonate chains. In this connection, it is noted that, in general, it is difficult to provide an aromatic polycarbonate wherein the above-mentioned amount of the methyl group-substituted divalent constituent group is less than 0.00000001 in terms of the above-defined ratio. However, the effects of the present invention can be achieved as long as the above-defined molar ratio of the methyl group-substituted divalent constituent group is 0.0001 or less.

It has surprisingly been found that, by adding a thermal stabilizer to an aromatic polycarbonate in which the amount of the methyl group-substituted divalent constituent groups in the recurring units is controlled to such a very small value, an extremely excellent aromatic polycarbonate composition can be obtained which is advantageous not only in that it is improved with respect to the suppression of discoloration at high-temperature molding, but also in that when it is continuously injection-molded and the continuous molding is interrupted and then restarted, the occurrence of unfavorable phenomena, such as deposition of black spots, and development of brown streaks, uneven color and the like, can be effectively suppressed. The reason why such excellent effects can be obtained by controlling the amount of methyl group-substituted constituent divalent aromatic groups in the recurring units of the aromatic polycarbonate has not yet been elucidated. However, it is presumed that methyl group-substituted constituent aromatic groups in the recurring units undergo a branching reaction at high temperatures, thus causing discoloration. Further, it is presumed that, when the continuous molding of an aromatic polycarbonate composition is interrupted and then restarted, the methyl group-substituted aromatic groups in the recurring units undergo not only a branching reaction but also a gelation reaction, thus causing unfavorable phenomena, such as deposition of black spots, and development of brown streaks, uneven color and the like.

A preferred example of divalent aromatic groups is a group represented by the following formula (15):

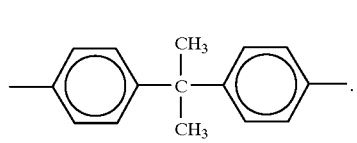

(15)

It is especially preferred that the aromatic polycarbonate contain 85 mole % or more, based on the moles of all of the monomer units in the plurality of aromatic polycarbonate chains, of recurring units each having an Ar represented by the above formula (15).

The aromatic polycarbonate used in the present invention may contain a comonomer unit containing a $C_6$–$C_{300}$ tri- or more valent aromatic group, as long as the effects of the present invention are not impaired.

Each of the plurality of aromatic polycarbonte chains constituting the aromatic polycarbonate used in the present invention has terminal groups which are each independently selected from the group consisting of a terminal aryl carbonate group and a terminal hydroxyl group, provided that the plurality of aromatic polycarbonate chains collectively contain a plurality of terminal aryl carbonate groups.

Each of the above-mentioned terminal aryl carbonate groups is independently represented by the following formula (2):

(2)

wherein $Ar^3$ represents a monovalent $C_6$–$C_{200}$ aromatic or pyridyl group which is unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group.

Representative examples of monovalent aromatic or pyridyl groups $Ar^3$ include a phenyl group, a naphthyl group and a pyridyl group, which are unsubstituted or substituted with at least one substituent as described above Preferred examples of terminal aryl carbonate groups include groups respectively represented by the following formulae (16):

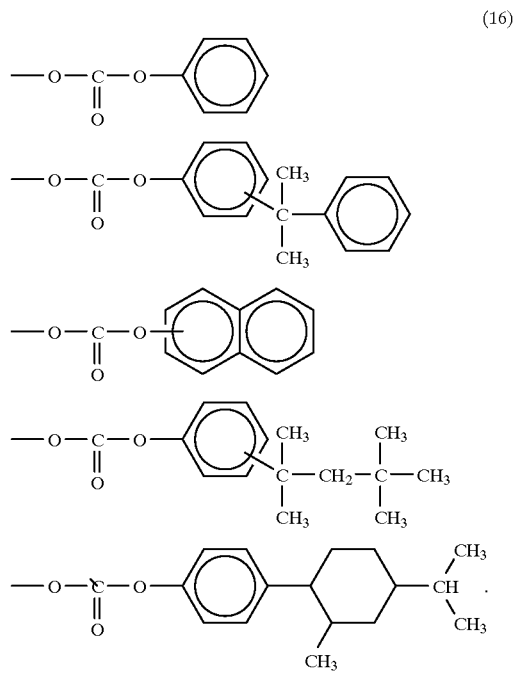

(16)

With respect to the terminal aryl carbonate groups of the aromatic polycarbonate, it is preferred that the plurality of aromatic polycarbonate chains collectively have, in the plurality of terminal aryl carbonate groups thereof, at least one monovalent $C_6$–$C_{200}$ aromatic or pyridyl group substituted with at least one methyl group in an amount of 0.0002 or less in terms of the molar ratio of the methyl group-substituted monovalent group or groups relative to all monovalent groups in the plurality of terminal aryl carbonate groups of the plurality of aromatic polycarbonate chains. In this connection, it is noted that, in general, it is difficult to provide an aromatic polycarbonate wherein the above-mentioned amount of the methyl group-substituted monovalent group is less than 0.00000001 in terms of the above-defined ratio. However, the effects of the present invention can be enhanced as long as the above-defined molar ratio of the methyl group-substituted monovalent group is 0.0002 or less.

It has also su been found that, by adding a thermal stabilizer to an aromatic polycarbonate in which the amount of the methyl group-substituted monovalent groups in the terminal aryl carbonate groups is controlled to such a very small value, an extremely excellent aromatic polycarbonate composition can be obtained which is advantageous not only in that it is improved with respect to the suppression of discoloration at high-temperature molding, but also in that when it is continuously injection-molded and the continuous molding is interrupted and then restarted, the occurrence of unfavorable phenomena, such as deposition of black spots, and development of brown streaks, uneven color and the like, can be effectively suppressed. The reason why such excellent effects can be obtained by controlling the amount of the methyl group-substituted monovalent groups in the terminal aryl carbonate groups of the aromatic polycarbonate has not yet been elucidated. However, it is presumed that, as in the case of the adverse effects of the above-mentioned methyl group-substituted constituent divalent groups in the recurring units, the methyl group-substituted monovalent groups in the terminal aryl carbonate groups undergo a branching reaction and a gelation reaction at high temperatures, thus causing discoloration and other unfavorable phenomena, such as deposition of black spots, and development of brown streaks, uneven color and the like.

With respect to the molar ratio of terminal hydroxyl groups to terminal aryl carbonate groups, there is no particular limitation, but the molar ratio of from 1:99 to 30:70 is preferred.

In the present invention, the weight average molecular weight of the aromatic polycarbonate is from 1,000 to 300,000, preferably from 5,000 to 100,000, more preferably from 12,000 to 80,000.

In the aromatic polycarbonate composition of the present invention, the aromatic polycarbonate is substantially free of a chlorine-containing compound, i.e., substantially free of a chlorine atom. In the present invention, the term "substantially free of a chlorine atom" means that both the following two requirements are satisfied:

(1) the chlorine atom content must be less than 0.5 ppm, preferably less than 0.1 ppm, in terms of chlorine ions as measured by potentiometric titration using an aqueous 1/500N silver nitrate solution or by ion chromatography (0.1 ppm is the detection limit of these measuring methods); and (2) the chlorine atom content must be less than 10 ppm as measured by the combustion method (10 ppm is the detection limit of this method).

When the content of chlorine atoms in the aromatic polycarbonate exceeds the above-mentioned upper limits, corrosion of the material of a molding apparatus is likely to occur. In addition, due to the corrosion of the material of a molding apparatus, the surface of the molding apparatus becomes roughened, so that the aromatic polycarbonate composition is likely to adhere to and remain in the roughened surface of the molding apparatus, resulting in deposition of black spots.

With respect to the thermal stabilizers used in the present invention, there is no particular limitation as long as they are those which can be used in polycarbonates. For example, a phosphorus stabilizer, a phenolic stabilizer, a sulfur stabilizer, an epoxy stabilizer and a hindered amine stabilizer can be used in the present invention.

Examples of phosphorus stabilizers include phosphorus-containing acids, phosphorous esters, phosphinic esters, phosphoric esters and phosphonic esters. Representative examples of phosphorus-containing acids include phosphoric acid, phosphorous acid, hypophosphorous acid, pyrophosphoric acid, polyphosphoric acid, phosphinic acids represented by the following formula (17):

(17)

and phosphonic acids represented by the following formula (18):

(18)

wherein $R^9$ represents an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; or an alkylaryl group, such as a tolyl group, a p-t-butylphenyl group, a 2,4-di-t-butylphenyl group, a 2,6-di-t-butylphenyl group, a p-nonylphenyl group and a dinonylphenyl group.

More specific examples of phosphinic acids include phenylphosphonic acid. These compounds can be used individually or in combination.

Examples of phosphorous esters include a phosphorous triester, a phosphorous diester and a phosphorous monoester which are, respectively, represented by the following formulae (19) to (22):

(19)

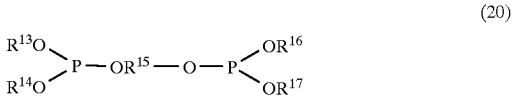

(20)

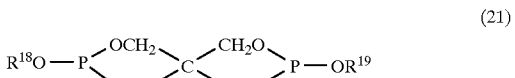

(21)

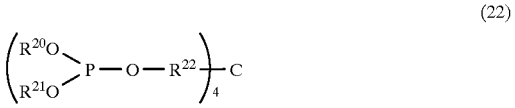

(22)

wherein each of $R^{10}$, $R^{11}$, $R^{12}$, $R^{13}$, $R^{14}$, $R^{16}$, $R^{17}$, $R^{18}$, $R^{19}$, $R^{20}$ and $R^{21}$ independently represents a hydrogen atom, an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; or an alkylaryl group, such as a tolyl group, a p-t-butylphenyl group, a 2,4-di-t-butylphenyl group, a 2,6-di-t-butylphenyl group, a nonylphenyl group and a dinonylphenyl group; and each of $R^{15}$ and $R^{22}$ independently represents alkylene, arylene or arylalkylene, with the proviso that not all of $R^{10}$, $R^{11}$, $R^{12}$, $R^{13}$, $R^{14}$, $R^{16}$, $R^{17}$, $R^{18}$, $R^{19}$, $R^{20}$ and $R^{21}$ are hydrogen atoms.

Specific examples of phosphorous triesters include tris(2,4-di-t-butylphenyl)phosphite, tris(nonylphenyl)phosphite, tris(dinonylphenyl)phosphite, triphenyl phosphite, tetraphenyldipropylene glycol phosphite, tetra(tridecyl)4,4'-isopropylidene diphenyldiphosphite, bis(tridecyl) pentaerythritol diphosphite, bis(nonylphenyl)pentaerythritol diphosphite, bis(2,4di-t-butylphenyl)pentaerythritol diphosphite, bis(2,6di-t-butyl-4-methylphenyl) pentaerythritol diphosphite, distearyl pentaerythritol diphosphite, a hydrogenated bisphenol A/pentaerythritol phosphite polymer and tetraphenyltetra(tridecyl) pentaerythritol tetraphosphite. Among these compounds; phosphorous triesters having a 2,4-di-t-butylphenyl group or a 2,6-di-t-butylphenyl group are especially preferred, and specific examples of such especially preferred phosphorous triesters include tris (2,4-di-t-butylphenyl) phosphite, bis(2,4-di-t-butylphenyl)pentaerythritol diphosphite and bis(2,6-di-t-butyl-4-methylphenyl)pentaexythritol diphosphite.

Preferred examples of phosphorous diesters include aromatic phosphorous diesters. Examples of aromatic phosphorous diesters include diphenyl hydrogen phosphite, bis(nonylphenyl) hydrogen phosphite, bis(2,4-di-t-butylphenyl) hydrogen phosphite, dicresyl hydrogen phosphite, bis(p-t-butylphenyl) hydrogen phosphite and bis(p-hexylphenyl) hydrogen phosphite.

Specific examples of phosphorous monoesters include phenyl dihydrogen phosphite, nonylphenyl dihydrogen phosphite and 2,4-di-t-butylphenyl dihydrogen phosphite. These compounds can be used individually or in combination.

Examples of phosphinic esters include phosphinic monoesters and phosphinic diesters represented by the following formulae (23) and (24):

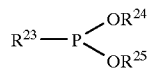
(23)

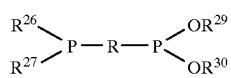
(24)

wherein each of $R^{23}$, $R^{26}$ and $R^{27}$ independently represents an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; or an alkylaryl group, such as a tolyl group, a p-t-butylphenyl group, a 2,4-di-t-butylphenyl group, a 2,6-di-t-butylphenyl group, a p-nonylphenyl group and a dinonylphenyl group.; and each of $R^{24}$, $R^{25}$, $R^{29}$ and $R^{30}$ irxependently represents a hydrogen atom; an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; or an alkylaryl group, such as a tolyl group, a p-t-butylphenyl group, a 2,4-di-t-butylphenyl group, a 2,6-di-t-butylphenyl group, a p-nonylphenyl group and a dinonylphenyl group; and $R^{28}$ represents alkylene, arylene or arylalkylene.

A representative example of these compounds is tetrakis (2,4-di-t-butylphenyl) 4,4'-biphenylene diphosphinate. These compounds can be used individually or in combination.

Examples of phosphoric esters include a phosphoric diester and a phosphoric monoester, which are represented by the following formulae (25) to (28):

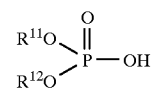
(25)

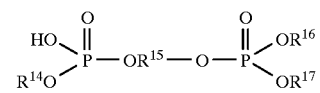
(26)

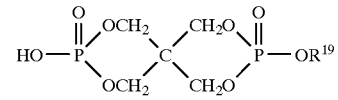
(27)

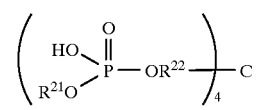
(28)

wherein $R^{11}$, $R^{12}$, $R^{14}$, $R^{15}$, $R^{16}$, $R^{17}$, $R^{19}$, $R^{21}$ and $R^{22}$ are as defined above.

Specific examples of phosphoric diesters inlclude diphenylhydrogen phosphate, bis (nonylphenyl) hydrogen phosphate, bis (2,4-di-t-butylphenyl) hydrogen phosphate, dicresyl hydrogen phosphate, bis(p-t-butylphenyl) hydrogen phosphate and bis(p-hexylphenyl) hydrogen phosphate.

Specific examples of phosphoric monoesters include phenyl dihydrogen phosphates nonylphenyl dihydrogen phosphate and 2,4-di-t-butylphenyl dihydrogen phophate. These compounds can be used individually or in combination.

Examples of phosphonic esters include phosphonic monoesters represented by the following formulae (29) and (30):

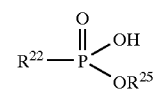
(29)

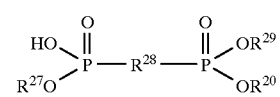
(30)

wherein $R^{23}$, $R^{25}$, $R^{27}$, $R^{28}$, $R^{29}$ and $R^{30}$ are as defined above.

The phenolic stabilizer is represented by the following formula (31):

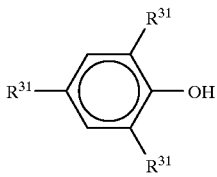
(31)

wherein each of $R^{31}$'s independently represents a hydrogen atom, a hydroxyl group, a $C_1$–$C_{10}$ alkoxyl group, or an unsubstituted or substituted $C_1$–$C_{10}$ hydrocarbon residue, with the proviso that at least one of $p^{31}$'s represents an unsubstituted or substituted hydrocarbon residue.

Specific examples of the above-mentioned phenolic stabilizers include 2,6-di-t-butyl-p-cresol, 2,6-di-t-butyl-p-anisole, 2,6-di-t-butyl-4-ethylphenol, 2,2'-methylene bis(6-t-butyl-p-cresol), 2,2'-methylene bis(4-ethyl-6-t-butylphenol), 4,4'-methylene bis(6-t-butyl-o-cresol), 4,4'-butylidene bis(6-t-butyl-m-cre-sol), tetrakis[methylene-3-(3', 5'-di-t-butyl-4'-hydroxyphenyl)propionate]methane, 4,4'-thio bis(6-t-butyl-m-cresol), stearyl-β-(3,5-di-t-butyl-4-hydroxyphenyl)propionate, 1,3,5-trimethyl-2,4,6-tris(3,5-di-t-butyl-4-hydroxybenzyl)benzene, 1,1,3-tris(2-methyl-4-hydroxy-5-t-butylphenyl)butane and triethylene glycol-bis[3-(3-t-butyl-5-methyl-4-hydroxyphenyl)propionate].

A preferred phenolic stabilizer is represented by the following formula (32):

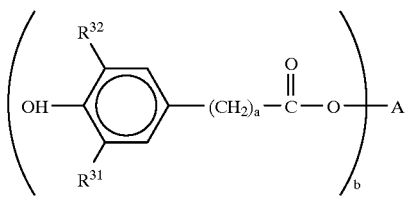
(32)

wherein $R^{32}$ represents a methyl group or a t-butyl group, $R^{33}$ represents a t-butyl group, A represents a $C_1$–$C_{30}$ hydrocarbon residue or a $C_1$–$C_{30}$ heterocyclic residue having a valence of b, a represents an integer of from 1 to 4 and b represent an integer of 1 or more.

Specific examples of the above-mentioned phenolic stabilizers include tetrakis[methylene-3-(3', 5'-di-t-butyl-4'-hydroxyphenyl)propionate]methane, stearyl-β-(3,5-di-t-butyl-4-hydroxyphenyl)propionate and triethylene glycol-bis[3-(3-t-butyl-5-methyl-4hydroxyphenyl)propionate].

Further examples of phenolic stabilizers include a phenolic stabilizer containing a phosphorus atom, such as 3,5-di-t-butyl-4-hydroxybenzyl phosphonate diethyl ester and calcium bis(3,5-di-t-butyl-4-hydroxybenzyl ethylphosphonate). These phenolic stabilizers can be used individually or in combination.

Examples of sulfur stabilizers include a sulfinic acid represented by the formula $R^{34}$—$SO_2$—$R^{35}$, a sulfonic acid represented by the formula $R^{34}$—$SO_3$—$R^{35}$, (in each of these formulae, $R^{34}$ is equivalent to $R^9$ and $R^{35}$ is equivalent to $R^{10}$), esters thereof, and thioether compounds represented by the following formula (33):

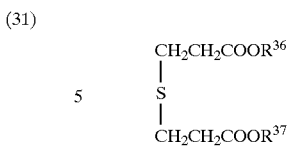
(33)

wherein each of $R^{36}$ and $R^{37}$ independently represents a $C_{12}$–$C_{18}$ alkyl group.

Specific examples of the above-mentioned sulfur stabilizers include benzenesulfinic acid, p-toluenesulfonic acid, benzenesulfonic acid, p-toluenesulfonic acid, naphthalenesulfonic acid, and a methyl-, an ethyl-, a butyl-, an octyl- and a phenylester thereof. Further examples include dilauryl-3,3'-thiodipropionate, ditridecyl-3,3'-thiodipropionate, dimyristyl-3,3'-thiodipropionate, distearyl-3,3'-thiodipropionate and pentaerythritol(β-laurylthiopropinate). These sulfur stabilizers can be used individually or in combination.

Examples of epoxy stabilizers include epoxycontaining fats and oils, such as epoxidated soybean oil and epoxidated linseed oil; glycidyl compounds, such as phenylglycidyl ether, allylglycidyl ether, t-butylphenylglycidyl ether, bisphenol A diglycidyl ether, tetrabromo bisphenol A diglycidyl ether, diglycidyl phthalate, diglycidyl hexahydrophthalate; epoxycyclohexane compounds, such as 3,4-epoxycyclohexylmethyl-3,4-epoxycyclohexane carboxylate, 3,4-epoxy-6-methylcyclohexylmethyl-3,4-epoxycyclohexane carboxylate, 2,3-epoxycyclohexylmethyl-3,4-epoxycyclohexane carboxylate, 4-(3,4-epoxy-5-methylcyclohexyl) butyl-3,4-epoxycyclohexane carboxylate, 3,4-epoxycyclohexylethylene oxide, cyclohexylmethyl-3,4-epoxycyclohexane carboxylate, 3,4-epoxy-6-methylcyclohexylmethyl-6-methylcyclohexane carboxylate, bisepoxycyclohexyl adipate, octadecyl-2,2'-dimethyl-3,4-epoxycyclohexane carboxylate, n-butyl-2,2'-dimethyl-3,4-epoxycyclohexane carboxylate, cyclohexyl-2-methyl-3,4-epoxycyclohexane carboxylate, n-butyl-2-isopropyl-3,4-epoxy-5-methyicyclohexane carboxylate, octadecyl-3,4-epoxycyclohexane carboxylate, 2-ethylhexyl-3,4-epoxycyclohexane carboxylate, 4,6-dimethyl-2,3-epoxycyclohexyl-3,4-epoxycyclohexane carboxylate, diethyl-4,5-epoxy-cis-1,2-cyclohexane carboxylate, di-n-butyl-3-t-butyl-4,5-epoxy-cis-1,2-cyclohexane carboxylate, 3,4-dimethyl-1,2-epoxycyclohexane, 3,5-dimethyl-1,2-epoxycyclohexane and 3methyl-5-t-butyl-1,2-epoxycyclohexane; bisepoxydicyclopentadienyl ether; butadiene diepoxide; tetraphenylethylene epoxide; epoxidated polybutadiene; 4,5-epoxytetrahydrophthalic anhydride; and 3-t-butyl-4,5-epoxytetrahydrophthalic anhydride. These epoxy stabilizers can be used individually or in combination.

Examples of hindered amine stabilizers include bis(2,2,6,6-tetramethyl-4-piperidyl)sebacate, bis(1,2,6,6-pentamethyl-4-piperidyl)sebacate, bis(1,2,2,6,6-pentamethyl-4-piperidyl)2-(3,5-di-t-butyl-4-hydroxybenzyl)-2-n-butylmalonate, tetrakis(2,2,6,6-tetramethyl-4-piperidyl)1,2,3,4-butane tetracarboxylate, 1-[2-{3-(3,5-di-t-butyl-4-hydroxyphenyl) propionyloxy}ethyl]-4-{3-(3,5di-t butyl-4-hydroxyphenyl) propionyloxy}-2,2,6,6-tetranethylpiperidine, 8-benzyl-7,7,9,9-tetramethyl-3-octyl-1,2,3-triazaspiro{4,5}undecane-2,4-dione and 4-benzoyloxy-2,2,6,6-tetramethylpiperidine. These hindered amine stabilizers can be used individually or in combination.

These thermal stabilizers may be used individually or in combination. The amount of the thermal stabilizer to be added to the aromatic polycarbonate is not specifically limited, however, the thermal stabilizer is used in an amount of preferably from 0.0002 to 0.5 part by weight, more preferably from 0.0002 to 0.3 part by weight, relative to 100 parts by weight of the aromatic polycarbonate. In the case of adding a phosphorous diester or a phosphorous monoester as a thermal stabilizer, it is used in an amount of preferably from 0.0002 to 0.015 part by weight, more preferably from 0.0002 to 0.009 part by weight, relative to 100 parts by weight of the aromatic polycarbonate.

Among the above-mentioned thermal stabilizers, a phosphorus stabilizer having an active hydrogen atom, a sulfur stabilizer having an active hydrogen atom, a sulfinic ester and a sulfonic ester are preferred. Examples of phosphorus stabilizers having an active hydrogen atom include a phosphorus-containing acid, a phosphinic acid, a phosphonic acid, a phosphorous diester, a phosphorous monoester, a phosphinic monoester, a phosphoric diester, a phosphoric monoester and a phosphonic monoester which are mentioned above. Examples of sulfur stabilizers having an active hydrogen atom include a sulfinic acid and a sulfonic acid. Among them, a phosphorus stabilizer having an active hydrogen atom, especially a phosphorous monoester and a phosphorous diester are preferred, because the use thereof effectively suppresses not only the occurrence of discoloration of the aromatic polycarbonate at high temperatures but also the occurrence of deposition of black spots and the like after the interruption and restart of a continuous molding.

When the above-mentioned thermal stabilizers are used in combination, the combination of the thermal stabilizers is not specifically limited. However, preferred is a combination of at least one member selected from the group consisting of the above-mentioned phosphorus stabilizer having an active hydrogen atom, sulfur stabilizer having an active hydrogen atom, sulfinic ester and sulfonic ester with at least one member selected from the group consisting of another type of phosphorus stabilizer, and another type of sulfur stabilizer, a phenolic stabilizer, an epoxy stabilizer and a hindered amine stabilizer. Among them, especially preferred is a combination of at least one member selected from the group consisting of a phosphorus stabilizer having an active hydrogen atom, a sulfur stabilizer having an active hydrogen atom, a sulfinic ester and a sulfonic ester, particularly at least one member selected from the group consisting of a phosphorous diester and a phosphorous monoester, with at least one member selected from the group consisting of a phosphorous triester, a phosphinic diester and a phenolic stabilizer. By using these stabilizers, not only can the occurrence of discoloration, black spots and the like be suppressed, but also the discoloration resistance and long-term thermal aging resistance (which are desirable properties for an aromatic polycarbonate composition) can be improved, especially when it has been recycled The aromatic polycarbonate composition of the present invention may comprise additives as long as the advantages of the aromatic polycarbonate composition of the present invention are not spoiled. Examples of additives include a thermal stabilizer and antioxidant other than the above-mentioned thermal stabilizers and antioxidants, a weathering stabilizer, a mold release agent, a lubricant, an antistatic agent, a plasticizer, a resin other than a polycarbonate or a polymer such as a rubber, a pigment, a dye, a filler, a reinforcing agent, and a flame retardant. These additives can be used in amounts such as used for conventional aromatic Id polycarbonates.

The aromatic polycarbonate used in the present invention can be produced by a conventional method Specifically, the aromatic polycarbonate can be produced by, for example, an interfacial process (e.g., phosgene process) in which an aromatic dihydroxy compound and a carbonate precursor (e.g., phosgene) are reacted with each other in the presence of an aqueous sodium hydroxide solution and methylene chloride as a solvent, and a transesterification process. Examples of transesterification processes include a melt process in which an aromatic dihydroxy compound and a diphenyl carbonate are reacted with each other in the molten state, and a solid-state polymerization process in which a carbonate prepolymer obtained by the phosgene process or by the melt process is crystallized and subjected to solid-state polymerization (see, for example, Unexamined Japanese Patent Application Laid-Open Specification Nos. 1-158033, 1-271426, 3-68627). Among conventional methods, a melt process and a solid-state polymerization process are preferred from the viewpoint of reducing the content of a chlorine-containing compound in the obtained aromatic polycarbonate to 0.1 ppm by weight or less.

When the aromatic polycarbonate used in the present invention is produced by a melt process or a solid-state polymerization process, an aromatic dihydroxy compound and diaryl carbonate are used as starting materials.

In this connection, it should be noted that, for obtaining the aromatic polycarbonate usable in the present invention, there is a limitation with respect to the content of the methyl group-substituted constituent aromatic group in the aromatic dihydroxy compound.

Specifically, as mentioned above, in another aspect of the present invention, there is provided a method for producing an aromatic polycarbonate composition, comprising:

providing an aromatic polycarbonate produced by transesterification of an aromatic dihydroxy compound represented by the following formula (3):

HO—Ar⁴—OH   (3)

wherein Ar⁴ is as defined above, with a diaryl carbonate represented by the following formula (4):

wherein each of Ar⁵ and Ar⁶ independently represents a monovalent $C_6$–$C_{200}$ aromatic or pyridyl group which is unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, the aromatic dihydroxy compound of the formula (3) being a mixture of an aromatic dihydroxy compound represented by the following formula (5):

HO—Ar⁴ˣ—OH   (5)

wherein Ar⁴ˣ represents a divalent $C_6$–$C_{200}$ aromatic or pyridylene group comprising one or more divalent constituent $C_6$–$C_{30}$ aromatic or pyridylene groups which are each independently unsubstituted or substituted with at least one substituent selected from the group consisting of a halogen atom, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, wherein when the number of divalent constituent groups in the divalent aromatic or pyridylene group $Ar^{4x}$ is two or more, the divalent constituent aromatic or pyridylene groups are arranged in series on each aromatic polycarbonate chain and the mutually adjacent divalent constituent aromatic or pyridylene groups are connected to each other directly or through a bonding group, and a methyl group-containing aromatic dihydroxy compound represented by the formula (6):

$$HO—Ar^{4y}—OH \qquad (6)$$

wherein $Ar^{4y}$ represents a divalent $C_7$–$C_{200}$ aromatic or substituted pyridylene group comprising one or more divalent constituent $C_6$–$C_{30}$ aromatic or pyridylene groups which are each independently unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7C_{31}$ aralkyl group, provided that the divalent aromatic or pyridylene group $Ar^{4y}$ contains at least one divalent constituent aromatic or pyridylene group substituted with at least one methyl group, wherein when the number of divalent constituent groups in the divalent aromatic or pyridylene group $A^{4y}$ is two or more, the divalent constituent aromatic or pyridylene groups are arranged in series on each aromatic polycarbonate chain and the mutually adjacent divalent constituent aromatic or pyridylene groups are connected to each other directly or through a bonding group, the content of the methyl group-containing aromatic dihydroxy compound of the formula (6) in the mixture being 200 ppm by weight or less; and adding a thermal stabilizer to the aromatic polycarbonate.

Preferred examples of $Ar^{4x}$ in the aromatic dihydroxy compound represented by the formula (5) above include groups represented by the above-mentioned formulae (13) and (14).

Preferred examples of $Ar^{4y}$ in the methyl group-containing aromatic dihydroxy compound represented by the formula (6) above include those which are represented by formulae (13) and (14), wherein with respect to $Ar^{4y}$ having one divalent constituent aromatic or pyridylene group m of $(R^7)_m$ represents an integer of from 1 to 4 and at least one $R^7$ represents a methyl group, and wherein with respect to $Ar^{4y}$ having two or more divalent constituent aromatic or pyridylene groups, at least one of m and n represents an integer of from 1 to 4 and at least one of $R^7$ and $R^8$ represents a methyl group.

Explanation is made below with respect to specific examples of diaryl carbonates of the formula (6) used in the method of the present invention. Each of $Ar^5$ and $Ar^6$ in the formula (4) independently represents, for example, a monovalent aromatic group selected from those which are represented by the following formulae (34):

(34)

-continued
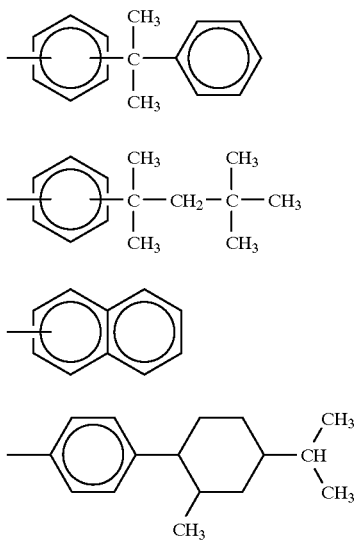

Among the above-mentioned diaryl carbonates, diphenyl carbonate, which has the simplest structure, is preferred.

In the method of the present invention, it is requisite to use a high purity aromatic dihydroxy compound-having a low content of a methyl group-containing aromatic compound. Such a high purity aromatic dihydroxy compound can be produced only by using, as a raw material, a compound having a low content of a methyl group-containing compound as an impurity.

For example, when the above-mentioned bisphenol A is used, it is preferred to use a bisphenol A product containing a methyl group-containing aromatic dihydroxy compound (having a methyl group-substituted constituent aromatic group) in a concentration of-200 ppm by weight or less, more preferably 80 ppm by weight or less. When an aromatic polycarbonate is obtained by using, for example, a bisphenol A product containing 200 ppm by weight of 2-(4-hydroxy-3-methylphenyl)-2-(4-hydroxyphenyl) propane, the molar ratio of the methyl group-substituted aromatic group or groups relative to all aromatic groups in the recurring units of the plurality of aromatic polycarbonate chains of the obtained aromatic polycarbonate is usually 0.0001. In general, a commercially available bisphenol A product contains an impurity having a structure such that the aromatic group of bisphenol A is substituted with a methyl group. This impurity is derived from cresol contained in a phenol product used as a raw material for producing the bisphenol A product. Accordingly, it is necessary that a bisphenol A product be obtained by using high purity phenol having a low content of cresol. Only by using such a high purity phenol product, it becomes possible to produce a bisphenol A product containing a methyl group-containing aromatic dihydroxy compound (having a methyl group-substituted constituent aromatic group) in a concentration of 200 ppm by weight or less. In this connection, it is noted that, in general, it is difficult to provide an aromatic dihydroxy compound product wherein the above-mentioned concentration of the methyl group-containing aromatic dihydroxy compound is less than 20 ppb by weight. However, the effects of the present invention can be achieved as long as the above-defined concentration of the methyl group-containing aromatic dihydroxy compound is 200 ppm by weight or less. Further, it is preferred that the contents of a chlorine atom; an alkali metal and an alkaline earth metal in the aromatic dihydroxy carbonate be low. It is more preferred that the aromatic dihydroxy compound be substantially free of a chlorine atom, an alkali metal and an alkaline earth metal.

Further, it is also desired to use a high purity diaryl carbonate product.

Explanation will be made below on the impurity content of a diphenyl carbonate product as an example of diaryl carbonates. It is preferred to use a diphenyl carbonate product containing a methyl group-containing diaryl carbonate (having a methyl group-substituted constituent aromatic group) in a concentration of 300 ppm by weight or less, more preferably 200 pm by weight or less. In this connection, it is noted that, in general, it is difficult to provide a diaryl carbonate product wherein the above-mentioned concentration of the methyl group-containing diaryl carbonate is less than 20 ppb by weight. When an aromatic polycarbonate is obtained by using a diaryl carbonate product containing 2-methylphenyl phenyl carbonate (which is a diaryl carbonate having a methyl group-substituted aromatic group) in an amount of 300 ppm by weight, the molar ratio of the methyl group-substituted aromatic group or groups relative to all aromatic groups in the terminal aryl carbonate groups of the plurality of aromatic polycarbonate chains of the obtained aromatic polycarbonate varies depending on the polymerization conditions or the like, but is generally from 0.00015 to 0.0002. Further, it is preferred that the contents of a chlorine atom, an alkali metal and an alkaline earth metal in the above-mentioned diaryl carbonate be low. It is more preferred that the diaryl carbonate be substantially free of a chlorine atom, an alkali metal and an alkaline earth metal.

In a preferred mode of the method of the present invention for producing an aromatic polycarbonate composition, the diaryl carbonate represented by the formula (4) is a mixture of a diaryl carbonate represented by the following formula (7):

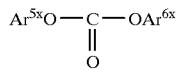

(7)

wherein each of $Ar^{5x}$ and $Ar^{6x}$ independently represents a monovalent $C_6$–$C_{200}$ aromatic or pyridyl group which is unsubstituted or substituted with at least one substituent selected from the group consisting of a halogen atom, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, and a methyl group-containing diaryl carbonate represented by the formula (8):

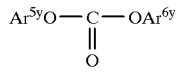

(8)

wherein each of $Ar^{5y}$ and $Ar^{6y}$ independently represents a monovalent $C_6$–$C_{200}$ aromatic or pyridyl group which is unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, provided that at least one of the monovalent aromatic or pyridyl groups $Ar^{5y}$ to $Ar^{6y}$ is substituted with at least one methyl group, the content of the methyl group-containing diaryl carbonate of the formula (8) in the mixture being 300 ppm by weight or less.

Preferred examples of $Ar^{5x}$ and $Ar^{6x}$ in the diaryl carbonate represented by the formula (7) above include groups represented by the above-mentioned formulae (34).

Examples of $Ar^{5y}$ and $Ar^{6y}$ in the methyl group-containing diaryl carbonate represented by the formula (8) above include those which are represented by the formulae (34) in which at least one monovalent aromatic or pyridyl group is substituted with at least one methyl group.

The method of the present invention is especially advantageously employed when the aromatic polycarbonate to be used is produced on a relatively large commercial scale. It is preferred that the production capacity of the production apparatus used for producing the aromatic polycarbonate to be used in the method of the present invention be 1,000 tons or more per year, more preferably 5,000 tons or more per year, most preferably 10,000 tons or more per year, in terms of the weight of the aromatic polycarbonate produced.

The ratio in which the aromatic dihydroxy compound and the diaryl carbonate are used (i.e., a charging ratio) may be varied depending on the respective types of the aromatic dihydroxy compound and diaryl carbonate employed, the polymerization temperature and other polymerization conditions, the desired molecular weight of a polycarbonate to be produced, and the desired proportions of the terminal groups of the polycarbonate. The diaryl carbonate is generally used in an amount of from 0.9 to 2.5 moles, preferably from 0.95 to 2.0 moles, more preferably from 0.98 to 1.5 moles, per mole of the aromatic dihydroxy compound.

In the present invention, for introducing a branched structure to the polycarbonate, a tri- or more valent aromatic hydroxy compound may be used in the production of the polycarbonate, as long as the objective of the present invention can be achieved. Also, an aromatic monohydroxy compound may be used for changing the terminal groups, or adjusting the molecular weight of the polycarbonate.

It is preferred that the aromatic polycarbonate used in the aromatic polycarbonate composition of the present invention be produced from the above-mentioned aromatic dihydroxy compound and diaryl carbonate by transesterification therebetween. The transesterification process is a process in which a condensation polymerization by transesterification is performed in the molten state or solid state while heating in the presence or absence of a catalyst under reduced pressure, under an inert gas flow or under both reduced pressure and an inert gas flow. The mode of the transesterification process, the polymerization equipment and the like are not specifically limited.

For example, when a molten-state transesterification is employed, examples of reactors employable for performing the transesterification reaction include an agitation type reactor vessel, a wiped film type reactor, a centrifugal wiped film evaporation type reactor, a surface renewal type twin-screw kneading reactor, a twin-screw horizontal agitation type reactor, a wall-wetting fall reactor, a free-fall reactor having a perforated plate, and a wire-wetting fall reactor having a perforated plate and at least one wire. These various types of reactors can be used individually or in combination.

In a wall-wetting fall polymerization using a wall-wetting fall reactor, at least one polymerizable material selected from the group consisting of a molten monomer mixture of an aromatic dihydroxy compound and a diaryl-carbonate, and a molten prepolymer obtained by reacting an aromatic dihydroxy compound with a diaryl carbonate is fed in the molten state to an upper portion of a wall extending downwardly through a wall-wetting fall polymerization reaction zone, and allowed to fall along and in contact with the surface of the wall, thereby effecting the polymerization during the wall-wetting fall thereof.

In a free-fall polymerization using a free-fall reactor, the same polymerizable material as mentioned above is fed in the molten state to a feeding zone having a perforated plate and allowed to pass downwardly through the perforated plate and fall freely through a free-fall polymerization reaction zone, thereby effecting the polymerization during the free-fall.

In a wire-wetting fall polymerization using a wire-wetting-fall reactor, the same polymerizable material as mentioned above is fed in the molten state to a feeding zone having a perforated plate and allowed to pass downwardly through the perforated plate and fall along and in contact with a wire through a wire-wetting fall polymerization reaction zone, thereby effecting polymerization of the polymerizable material during the wire-wetting fall thereof.

The perforated plate to be used in a wire-wetting fall polymerization has at least one hole. The feeding zone in the wire-wetting fall reactor communicates, through the hole, with a polymerization zone comprising a wire-wetting fall polymerization reaction zone. The wire-wetting fall polymerization reaction zone has at least one wire in correspondence with the hole, and the wire is securely held at one end thereof in an upper end portion of the wire-wetting fall polymerization reaction zone and extends downwardly through the wire-wetting fall polymerization reaction zone.

With respect to the positional relationship between the at least one wire and the perforated plate, and to the positional relationship between the at least one wire and the at least one hole of the perforated plate, there is no particular limitation as long as a polymerizable material fed to the feeding zone is enabled to pass downwardly through the perforated plate and fall along and in contact with the at least one wire toward the lower end of the at least one wire. The wire and perforated plate either may be or may not be in contact with each other.

Figure 2:
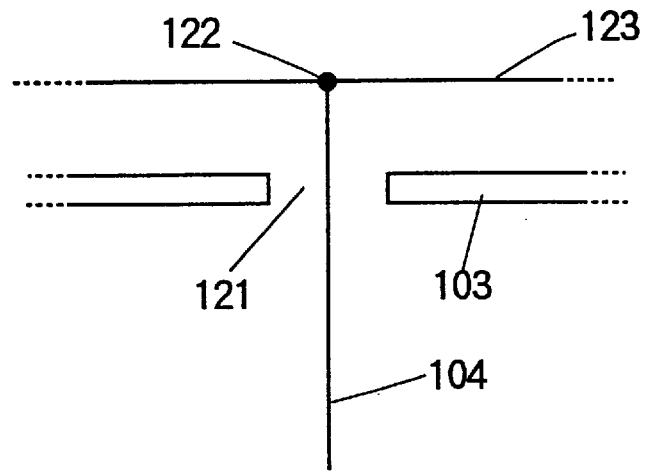
FIGS. 2 to 4 show various manners for securely holding a wire in a wire-wetting fall polymerizer.
Figure 3:
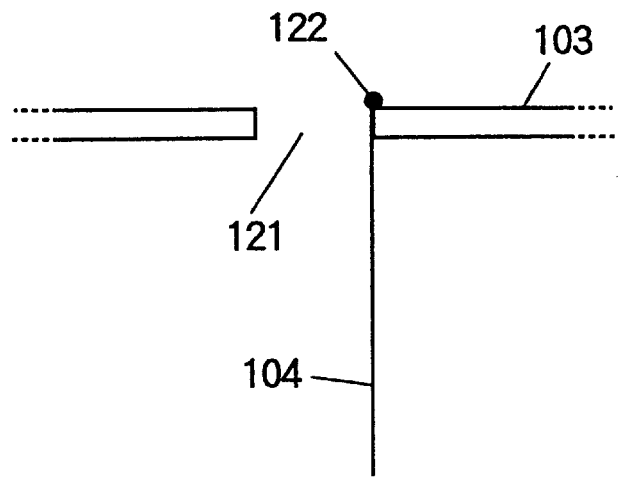
Figure 4:
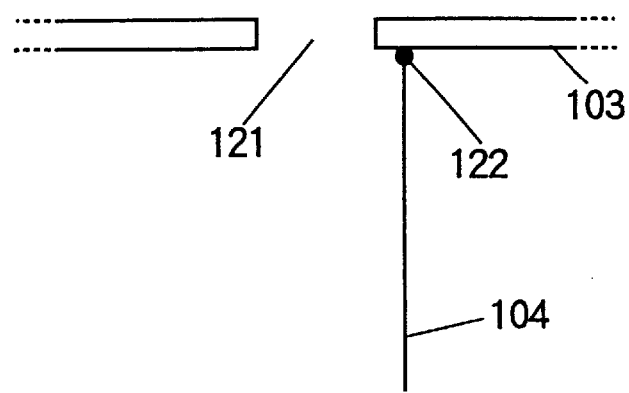

FIGS. 2 to 4 respectively show three examples of manners in which the wire is provided in correspondence with the hole of the perforated plate.

In FIG. 2, the upper end of wire 104 is secured to support rod 123 provided above perforated plate 103, and wire 104 extends downwardly through hole 121 of perforated plate 103. Wire 104 and support rod 123 are secured to each other at fixation point 122. It is possible that support rod 123 be omitted and the upper end of wire 104 be connected, for example, to the upper inner wall surface (not shown) of the wire-wetting fall reactor.

In FIG. 3, the upper end of wire 104 is secured to the upper circumferential edge of hole 121 of perforated plate 103 at fixation point 122, and wire 104 extends downwardly through hole 121 of perforated plate 103.

In FIG. 4, the upper end of wire 104 is secured to the lower surface of perforated plate 103 at fixation point 122, and wire 104 extends downwardly from the lover surface of perforated plate 103.

Alternatively, the upper end of wire 104 may be positioned below hole 121 of perforated plate 103. In such a case, a polymerizable material which has passed downwardly through perforated plate 103 may freely fall before falling along and in contact with wire 104 toward the lower end of wire 104. This embodiment (in which a wire-wetting fall is immediately preceded by a free fall) is enabled, for example, by a method in which a wire is attached to a support rod as shown in FIG. 2, and support rod 123 having wire 104 attached thereto is provided not at a position above perforated plate 103 as shown in FIG. 2, but at a position below perforated plate 103.

Further, the wire-wetting fall polymerization may be followed by a free-fall polymerization wherein a wire-wetting fall-polymerized product is consecutively allowed to fall freely through a free-fall polymerization reaction zone after leaving the lower end of the wire, wherein the free-fall polymerization reaction zone is provided downstream of and contiguously to the wire-wetting fall polymerization reaction zone.

The transesterification reaction can be performed by either molten-state polymerization or solid-state polymerization. Further, for example, the transesterification reaction can also be performed by a method In which a molten-state transesterification is first conducted to obtain a prepolymer, and then the obtained prepolymer is subjected to a solid-state polymerization under reduced pressure, under an inert gas flow or under both reduced pressure and an inert gas flow, by using a solid-state polymerizer, thereby elevating the polymerization degree. Examples of solid-state polymerizers include a tumbler, a fluidized-bed type polymerizer, a moving-bed type polymerlzer, a rotary kiln, and the like.

The temperature for conducting the transesterification is not specifically limited; however, the temperature is generally selected in the range of from 50° C. to 350° C., preferably from 100° C. to 300° C. In general, when the transesterification reaction temperature is higher than the above-mentioned range, the final polycarbonate exhibits marked discoloration and poor thermal stability. In general, when the transesterification reaction temperature is lower than the above-mentioned range, the reaction rate becomes low, so that the reaction becomes impractical. A suitable reaction pressure is selected depending on the molecular weight of the polycarbonate in the reaction system. When the weight average molecular weight of the polycarbonate in the reaction system is less than 2,000, a reaction pressure in the range of from 50 mmHg to atmospheric pressure is generally employed. When the weight average molecular weight of the polycarbonate in the reaction system is in the range of from 2,000 to 4,000, a reaction pressure in the range of from 3 mmHg to 80 mmHg is generally employed. When the weight average molecular weight of the polycarbonate in the reaction system is more than 4,000, a reaction pressure in the range of from 10 mmHg or less, preferably 5 mmHg or less is generally employed.

For obtaining the aromatic polycarbonate composition of the present invention, which is advantageous not only in that it is improved with respect to the suppression of discoloration at high-temperature molding, but also in that when it is continuously injection-molded and the continuous molding is interrupted and then restarted, the occurrence of unfavorable phenomena, such as deposition of black spots and the like, can be effectively suppressed, it is preferred that the polymerization be conducted at a temperature of 280° C. or lower. Among the above-mentioned polymerization apparatuses and modes of the transesterification, a surface renewal type twin-screw kneading reactor, a twin-screw horizontal agitation type reactor, a free-fall reactor having a perforated plate, and a wire-wetting fall reactor having a perforated plate and at least one wire, as well as a solid-state polymerization method are preferred because the polymerization can be carried out efficiently at a polymerization temperature of 280° C. or lower. Especially preferred are a free-fall reactor having a perforated plate, and a wire-wetting fall reactor having a perforated plate and at least one wire, as well as a solid-state polymerization method. With respect to materials for constructing the polymerizers to be used in the present invention, there is no particular limitation. However, stainless steel, nickel or glass is generally used as a material for at least inner wall portions of polymerizers.

The polymerization by the transesterification process may be carried out in the absence of a catalyst. However, when it is desired to increase the polymerization rate, it is preferred that the polymerization be effected in the presence of a catalyst. The polymerization catalysts which are customarily used in the art can be used without particular limitation. Examples of such catalysts Include hydroxides of an alkali metal and of an alkaline earth metal, such as lithium hydroxide, sodium hydroxide, potassium hydroxide and calcium hydroxide; alkali metal salts, alkaline earth metal salts and quaternary ammonium salts of boron hydride and of aluminum hydride, such as lithium aluminum hydride, sodium boron hydride and tetramethyl ammonium boron hydride; hydrides of an alkali metal and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as lithium phenoxide, sodium phenoxide, magnesium phenoxide, LiO—Ar—OLi wherein Ar represents an aryl group, and NaO—Ar—ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula $(R^1 R^2 R^3 R^4)NB$ $(R^1 R^2 R^3 R^4)$ wherein $R^1$, $R^2$, $R^3$ and $R^4$ are as defined above for formula (10), and phosphonium borates represented by the formula $(R^1 R^2 R^3 R^4)PB(R^1 R^2 R^3 R^4)$ wherein $R^1$, $R^2$, $R^3$ and $R^4$ are as defined above for formula (10); silicon compounds, such as silicon oxide, sodium silicate, tetraalkylsilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxides; and zirconium compounds, such as zirconium acetate, zirconium oxide, zirconium alkoxides, zirconium aryloxides and zirconium acetylacetone.

These catalysts can be used individually or in combination. The amount of the catalyst to be used is generally in the range of from $10^{-8}$ to 1% by weight, preferably from $10^{-7}$ to $10^{-1}$% by weight, based on the weight of the aromatic dihydroxy compound used as a raw material. When a catalyst containing at least one metal selected from an alkali metal and an alkaline earth metal is employed and the catalyst residue is not removed after the polymerization, it is preferred that the catalyst containing the at least one metal selected from an alkali metal and an alkaline earth metal be used in an amount such that the polycarbonate produced by the polymerization contains the at least one metal selected from the alkali metal and alkaline earth metal in an amount of not more than 2 ppm by weight, more preferably not more than 800 ppb by weight, based on the weight of the polycarbonate.

With respect to the method for mixing a thermal stabilizer with an aromatic polycarbonate, there is no particular limitation, and conventional methods for mixing a thermal stabilizer with an aromatic polycarbonate can be employed for obtaining the composition of the present invention. Examples of methods for mixing a thermal stabilizer with an aromatic polycarbonate include a method in which a stabilizer is first mixed with a polycarbonate using a Henschel mixer, a super mixer, a tumbling mixer, a ribbon blender or the like, and the resultant mixture is subjected to melt-kneading using a single-screw extruder, a twin-screw extruder, a Banbury mixer zor the like; and a method in which a stabilizer is mixed with a melt process polycarbonate obtained in the molten state, using a mixing tank, a static mixer, a single-screw, twin-screw or multi-screw extruder or the like. Other additives can be also be mixed with an aromatic polycarbonate by the same method as mentioned above for mixing a thermal stabilizer with a polycarbonate.

By molding the aromatic polycarbonate composition of the present invention, a precisely molded article which is extremely improved with respect to the suppression of unfavorable phenomena, such as discoloration, development of brown streaks, uneven color and the like can be produced.

BEST MODE FOR CARRYING OUT THE INVENTION

Hereinbelow, the present invention will be described in more detail with reference to the following Examples and Comparative Examples, but the Examples should not be construed as limiting the scope of the present invention.

In the following Examples and Comparative Examples, various properties were evaluated by the following method.
(1) Determination of the Weight Average Molecular Weight of an Aromatic Polycarbonate:

The weight average molecular weight of the produced aromatic polycarbonate was measured by gel permeation chromatography (GPC) (column: TSK-GEL, manufactured and sold by Tosoh Corp., Japan, solvent: THF), utilizing the molecular weight conversion calibration curve obtained with respect to the standard polystyrene samples each having a single molecular weight distribution represented by the following formula:

$$M_{pc} = 0.3591 M_{ps}^{1.0388}$$

wherein $M_{pc}$ represents the molecular weight of the polycarbonate, and $M_{ps}$ represents the molecular weight of the standard polystyrene.

(2) Measurement of the Chlorine Content:

The chlorine ion content of each of the produced aromatic polycarbonate, the aromatic dihydroxy compound and the diaryl carbonate was measured by ion chromatography, and the chlorine atom content of each of the above-mentioned compounds was measured by the combustion method.
(3) Determination of the Molar Ratio of the Methyl Group-substituted Constituent Aromatic Group or Groups Relative to all Constituent Aromatic Groups in the Recurring Units of Aromatic Polycarbonate Chains and the Molar Ratio of the Methyl Group-substituted Aromatic Group or Groups Relative to all Aromatic Groups in the Terminal Aryl Carbonate Groups:

The produced aromatic polycarbonate was subjected to hydrolysis with a 5N solution of potassium hydroxide in methanol at room temperature for 2 hours to obtain a hydrolyzed product of the aromatic polycarbonate. The molar ratio of the methyl group-substituted divalent constituent aromatic group or groups relative to all divalent constituent aromatic groups in the recurring units of the aromatic polycarbonate chains and the molar ratio of the methyl group substituted monovalent aromatic group or groups relative to all monovalent aromatic groups in the terminal aryl carbonate groups of the aromatic polycarbonate chains were determined by high performance liquid chromatography (HPLC) with respect to the above-mentioned hydrolyzed product of the aromatic polycarbonate.

(4) Determination of the Amount of the Methyl Group-containing Aromatic Dihydroxy Compound:

The amount of the methyl group-containing aromatic dihydroxy compound was measured by HPLC.

(5) Evaluation of the Melt Stability of an Aromatic Polycarbonate at High Temperatures:

The produced aromatic polycarbonate was subjected to continuous molding by using an injection molding machine (J100E, manufactured and sold by THE JAPAN STEEL WORKS. LED., Japan), at a cylinder temperature of 355° C. and a mold temperature of 90° C., and at a molding cycle of 45 seconds, to thereby obtain 20 test specimens each having a 216 mm length, a 12.6 mm width and a 3.2 mm thickness (specimen a). The aromatic polycarbonate remaining in the molding machine was allowed to stand at 355° C. for 60 minutes. Subsequently, the aromatic polycarbonate was subjected to molding at a cylinder temperature of 355° C. and a mold temperature of 90° C., to thereby obtain a 60-minutes heated specimen (specimen b). Substantially the same procedure as in the preparation of specimens a was repeated, to thereby obtain 20 molded products corresponding to specimen a (which molded products were not used in the evaluation mentioned below). Then, the aromatic polycarbonate remaining in the molding machine was allowed to stand in the molding machine for 30 minutes. Subsequently, the aromatic polycarbonate was subjected to molding under the same conditions as in the preparation of specimen b, to thereby obtain a 30-minutes heated specimen (specimen c). The color of the aromatic polycarbonate was evaluated with respect to specimens a, b and c, in accordance With the CIELAB method (Commission Internationale de l'Eclairage 1976 L*a*b* Diagram), and the yellowness of the specimen is expressed in terms of the b*-value (the b*-value of specimen a is an average value with respect to twenty specimen a's). The difference in yellowness (which difference is expressed in terms of the $\Delta b^*60$) between specimen a and specimen b was taken as an index of the thermal stability (melt stability) of the aromatic polycarbonate at high temperatures. The difference in yellowness (which difference is expressed in terms of the $\Delta b^*30$) between specimen a and specimen c was also determined as reference. The smaller the $\Delta b^*$-value of the specimen, the higher the melt stability of the aromatic polycarbonate at high temperatures.

(6) Evaluation of Properties of a Polycarbonate Composition after a Continuous Molding has been Interrupted and then Restarted:

A polycarbonate composition was subjected to continuous molding by using an injection molding machine (J100E, manufactured and sold by THE JAPAN STEEL WORKS. LTD., Japan), which had been disassembled and cleaned, at a cylinder temperature of 300° C. and a mold temperature of 90° C. for 10 days, to obtain box-shaped, molded articles, each having a wall thickness of 2 mm, a width of 100 mm, a length of 100 mm and a height of 50 mm. Using the molded boxes obtained, various properties of the polycarbonate composition were evaluated as follows:

i) The Number of Black Spots:

For mold cleaning, the continuous molding was interrupted for 1 hour. After completion of the mold cleaning, a continuous molding was restarted in substantially the same manner as mentioned above. With respect to the molded box obtained at the first molding shot after the restart of continuous molding, the number of appearing black spots having a diameter of about 50 µm or more was counted.

ii) The Number of Molding Shots Before Obtaining an Excellent Article:

The average color tone with respect to 10 molded boxes obtained immediately before the interruption of a continuous molding was determined. A continuous molding was restarted, and the number of molding shots (which was necessary for successively obtaining two boxes which were free of black spots and exhibited not only no local uneven color or brown streaks but also exhibited no significant difference in color tone from the above-mentioned 10 molded boxes) was counted.

EXAMPLE 1

A polycarbonate composition was produced by melt transesterification in accordance with a system as shown in FIG. 1. The system of FIG. 1 comprises first stage and second stage agitation polymerizations, and first stage and second stage wire-wetting fall polymerizations.

In the first stage wire-wetting fall polymerization, first wire-wetting fall polymerizer 110A was used. In the second stage wire-wetting fall polymerization, second wire-wetting fall polymerizer 110B was used. Each of the first and second wire-wetting fall polymerizers is equipped with a perforated plate which has 50 holes having a diameter of 7.5 mm and arranged in a zigzag configuration. In each of the first and second wire-wetting fall polymerizers, 50 strands of 1 mmø SUS 316 L wires are hung vertically from the respective holes of the perforated plate to a reservoir portion at the bottom of wire-wetting fall polymerizer 110 so that a polymerizable material will not fall freely (not free-fall) but fall along and in contact with the wires (wire-wetting fall). Illustratively stated, as shown in FIG. 2, each wire 104 is secured at the upper end thereof to support rod 123 provided above perforated plate 103, and extends downwardly through hole 121 of perforated plate 103. In each of the first and second wire-wetting fall polymerizers, the wire-wetting fall distance is 4 m. Only first wire-wetting fall polymerizer 110A has a recirculation line.

The first stage agitation polymerization in first agitation type polymerizer vessels 3A and 3B, each having a capacity of 100 liters, was batchwise conducted, whereas the second stage agitation polymerization in second agitation type polymerizer vessel 3C (having a capacity of 50 liters) and the first stage and second stage wire-wetting fall polymerizations in first and second wire-wetting fall polymerizers 110A and 110B were continuously conducted.

The polymerization reaction conditions in both of first agitation type polymerizer vessels 3A and 3B were as follows: the reaction temperature was 180° C., the reaction pressure was atmospheric pressure, and the flow rate of nitrogen gas was 1 liter/hr.

In operation, polymerizable materials [i.e., a bisphenol A product as an aromatic dihydroxy compound, wherein the chlorine atom content was less than 10 ppm by weight and the content of 2-(4-hydroxy-3-methylphenyl)-2-(4-hydroxyphenyl)propane was 80 ppm by weight; and a diphenyl carbonate product as a diaryl carbonate, wherein the chlorine atom content was less than 10 ppm by weight and the content of a 2-methylphenyl phenyl carbonate was 150 ppm (the molar ratio of the diphenyl carbonate product to the bisphenol A product: 1.10] were charged together with a disodium salt of bisphenol A as a catalyst (the molar ratio of the disodium salt of bisphenol A to the bisphenol A product: $2.8 \times 10^{-8}$) into each of first agitation type polymerizer vessels 3A and 3B. The monomer mixture in polymerizer 3A was polymerized in a molten state while agitating for 4 hours to obtain prepolymer 4A. Outlet 5A was opened, and prepolymer 4A was fed to second agitation type polymerizer vessel 3C, having a capacity of 50 liters, at a flow rate of 5 liters/hr.

While feeding prepolymer 4A obtained in first agitation type polymerizer vessel 3A to second agitation type polymerizer vessel 3C, first agitation type polymerizer vessel 3B was operated to polymerize the monomer mixture of bisphenol A and diphenyl carbonate in the same manner as in the agitation polymerization in first agitation type polymerizer vessel 3A, to obtain prepolymer 4B.

When first agitation type polymerizer vessel 3A became empty, outlet 5A of polymerizer 3A was closed and, instead, outlet 5B of polymerizer 3B was opened, so that prepolymer 4B was fed from first agitation type polymerizer vessel 3B to second agitation type polymerizer vessel 3C at a flow rate of 5 liters/hr. In this instance, the same polymerizable materials and catalyst as mentioned above were charged into polymerizer 3A. While feeding prepolymer 4B obtained in first agitation type polymerizer vessel 3B to second agitation type polymerizer vessel 3C, polymerizer vessel 3A was operated, so that the monomer mixture charged therein was polymerized in the same manner as mentioned above.

With respect to a batchwise polymerization in first agitation type polymerlzer vessels 3A and 3B and the alternate feedings of prepolymers 4A and 4B from polymerizers 3A and 3B to second agitation type polymerizer vessel 3C, the same operation as mentioned above was repeated, so that the prepolymer (either prepolymer 4A or prepolymer 4B, alternately) was continuously fed to second agitation type polymerizer vessel 3C.

In second agitation type polymerizer vessel 3C, a further agitation polymerization of prepolymers 4A and 4B, alternately fed from first agitation type polymerizer vessels 3A and 3B, was continuously carried out under polymerization reaction conditions wherein the reaction temperature was 230° C., the reaction pressure was 100 mmHg and the flow rate of nitrogen gas was 2 liters/hr, thereby obtaining prepolymer 4C.

When the volume of prepolymer 4C in second agitation type polymerizer vessel 3C reached 20 liters, part of prepolymer 4C was continuously fed to first wire-wetting fall polymerizer 110A so that the volume of prepolymer 4C in second agitation type polymerizer vessel 3C was constantly maintained at 20 liters. The feeding of prepolymer 4C to first wire-wetting fall polymerizer 110A was conducted through inlet 101A provided in recirculation line 102A for polymerizer 110A.

In first wire-wetting fall polymerizer 110A, a wire-wetting fall polymerization of prepolymer 4C was continuously carried out under polymerization reaction conditions wherein the reaction temperature was 250° C., and the reaction pressure was 2.0 mmHg and the flow rate of nitrogen gas was 1 liter/hr, thereby obtaining prepolymer 111A, while recirculating a part of obtained prepolymer 111A to the feeding zone (having perforated plate 103A) of first wire-wetting fall polymerizer 110A through recirculation line 102A at a recirculation rate of 200 liters/hr.

When the volume of prepolymer 111A at the bottom of first wire-wetting fall polymerizer 110A reached 5 liters, a part of prepolymer 111A was continuously fed to second wire-wetting fall polymerizer 110B so that the volume of prepolymer 111A in first wire-wetting fall polymerizer 110A was constantly maintained at 5 liters.

In second wire-wetting fall polymerizer 110B, a wire-wetting fall polymerization reaction was continuously carried out under polymerization reaction conditions wherein the reaction temperature was 250° C., and the reaction pressure was 1.0 mmHg and the flow rate of nitrogen gas was 1 liter/hr, thereby obtaining polycarbonate 111B.

When the volume of polycarbonate 111B at the bottom of second wire-wetting fall polymerizer 110B reached 5 liters, polycarbonate 111B was continuously withdrawn from second wire-wetting fall polymerizer 110B through outlet 109B by means of discharge pump 108B so that the volume of polycarbonate 111B in second wire-wetting fall polymerizer 110B was constantly maintained at 5 liters.

The above-mentioned series of polymerization reactions was continuously carried out for 700 hours.

The obtained aromatic polycarbonate was substantially free of a chlorine atom (the chlorine ion content was less than 0.1 ppm by weight and the chlorine atom-content was less than 10 ppm), and had a weight average molecular weight of 22,100. The aromatic polycarbonate chains collectively contained, in the recurring units thereof, a divalent constituent aromatic group substituted with a methyl group in an amount of 0.00004 in terms of the molar ratio of the methyl group-substituted divalent constituent aromatic groups relative to all divalent constituent aromatic groups in the recurring units of the aromatic polycarbonate chains. Further, the plurality of aromatic polycarbonate chains collectively had, in the plurality of terminal aryl carbonate groups thereof, a monovalent aromatic group substituted with a methyl group in an amount of 0.00008 in terms of the molar ratio of the methyl group-substituted monovalent aromatic group relative to all monovalent aromatic groups in the terminal aryl carbonate groups of the plurality of aromatic polycarbonate chains. 100 Parts by weight of the polycarbonate and a thermal stabilizer comprising 0.002 part by weight of bis(nonylphenyl) hydrogen phosphate and 0.02 part by weight of tris(2,4-di-tert-butylphenyl) phosphite were mixed well by means of a Henschel mixer, to thereby obtain a homogeneous mixture. means of an extruder and then pelletized to obtain an aromatic polycarbonate composition in the form of pellets. The obtained pellets were subjected to continuous injection molding, and various evaluations were made in accordance with the above-mentioned methods. Results are shown in Table 1.

EXAMPLES 2 to 4

In Examples 2, 3 and 4, aromatic polycarbonates were obtained in substantially the same manner as in Example 1, except that bisphenol A products containing 2-(4-hydroxy-3-methylphenyl)-2-(4-hydroxyphenyl)propane in different concentrations of 30 ppm by weight, 120 ppm by weight and 160 ppm by weight, respectively, were employed. Each of the aromatic polycarbonates obtained in Examples 2, 3 and 4 was substantially free of a chlorine atom (the chlorine ion content was less than 0.1 ppm by weight and the chlorine atom content was less than 10 ppm by weight), and had a weight average molecular weight of 22,100. Further, the plurality of aromatic polycarbonate chains collectively have, in the plurality of terminal aryl carbonate groups thereof, a monovalent aromatic group substituted with a methyl group in an amount of 0.00008 in terms of the molar ratio of the methyl group-substituted monovalent aromatic group relative to all monovalent aromatic groups in the terminal aryl carbonate groups of the plurality of aromatic polycarbonate chains.

Using each of the aromatic polycarbonates obtained in Examples 2, 3 and 4 individually, aromatic polycarbonate compositions were obtained in substantially the same as in Example 1. Each of the obtained aromatic polycarbonate compositions was individually subjected to continuous molding, and various evaluations were made in accordance with the above-mentioned methods. Results are shown in Table 1.

COMPARATIVE EXAMPLE 1

An aromatic polycarbonate composition was obtained in substantially the same as in Example 1, except that a bisphenol A product containing 2-(4-hydroxy-3methylphenyl)-2-(4-hydroxyphenyl)propane in a concentration of 240 ppm by weight was employed. The aromatic polycarbonate obtained had a weight average molecular weight of 22,100.

Using the aromatic polycarbonate obtained, an aromatic polycarbonate composition was obtained in substantially the same as in Example 1. The obtained aromatic polycarbonate composition was subjected to continuous molding, and various evaluations were made in accordance with the above-mentioned methods. Results are shown In Table 1.

COMPARATIVE EXAMPLE 2

An aromatic polycarbonate was produced by subjecting phosgene and a bisphenol A product to a phosgene process (interfacial process). 100 Parts by weight of the aromatic polycarbonate obtained and a thermal stabilizer comprising 0.002 part by weight of bis(nonylphenyl) hydrogen phosphite and 0.02 part by weight of tris(2,4-tert-butylphenyl) phosphite were mixed well by means of a Henschel mixer, to thereby obtain a homogeneous mixture. The obtained mixture was kneaded by means of an extruder, and then pelletized to thereby obtain an aromatic polycarbonate composition. The aromatic polycarbonate obtained by the phosgene process mentioned above had a chlorine ion in concentration of 1.2 ppm by weight and a chlorine atom in a concentration of 30 ppm by weight. Further, the plurality of aromatic polycarbonate chains collectively contain, in the recurring units thereof, a divalent constituent aromatic group substituted with a methyl group in an amount of 0.0008 In terms of the molar ratio of the methyl group-substituted divalent constituent aromatic group relative to all divalent constituent aromatic groups in the recurring units of the plurality of aromatic polycarbonate chains.

Using the aromatic polycarbonate, an aromatic polycarbonate composition was obtained In substantially the same as in Example 1. The obtained aromatic polycarbonate composition was subjected to continuous molding, and various evaluations were made in accordance with the above-mentioned methods. Results are shown in Table.

COMPARATIVE EXAMPLE 3

An aromatic polycarbonate was produced in the same manner as in Example 1. The obtained aromatic polycarbonate, to which a thermal stabilizer was not added, was subjected to continuous molding, and various evaluations were made in accordance with the above-mentioned methods. Results are shown in Table 1.

EXAMPLE 5

An aromatic polycarbonate composition was produced in substantially the same manner as in Example 1, except that a thermal stabilizer comprising 0.002 part by weight of bis(nonylphenyl) hydrogen phosphite, 0.01 part by weight of tris(2,4-di-tert-butylphenyl) phosphite and 0.01 part by weight of stearyl-β-(3,5-di-tertbutyl-4-hydroxyphenyl) propionate was employed.

The obtained aromatic polycarbonate composition was subjected to continuous injection molding, and various evaluations were made in accordance with the above-mentioned methods. Results are shown in Table 1.

EXAMPLE 6

An aromatic polycarbonate composition was produced in substantially the same manner as in Example 1, except that 0.02 part by weight of tris(2,4-di-tertbutylphenyl) phosphite was employed as a thermal stabilizer.

The obtained aromatic polycarbonate composition was subjected to continuous injection molding, and various evaluations were made in accordance with the above-mentioned methods. Results are shown in Table 1.

EXAMPLE 7

An aromatic polycarbonate composition was produced in substantially the same manner as in Example 1, except that 0.002 part by weight of bis(nonylphenyl) hydrogen phosphite was employed as a thermal stabilizer.

The obtained aromatic polycarbonate composition was subjected to continuous injection molding, and various evaluations were made in accordance with the above-mentioned methods Results are shown in Table 1.

EXAMPLE 8

A bisphenol A product (as an aromatic dihydroxy compound) containing 2-(4-hydroxy-3-methylphenyl)-2-(4hydroxyphenyl)propane in a concentration of 60 ppm and a diphenyl carbonate product (as a diaryl carbonate) containing 2-methylphenyl phenyl carbonate in a concentration of 100 ppm by weight were charged into an agitation type reaction vessel in a molar ratio of 1.00 (bisphenol A):1.05. (The chlorine atom content of each of the bisphenol A product and the diphenyl carbonate product was less than 10 ppm by weight.) A condensation polymerization was conducted to thereby obtain a polycarbonate prepolymer having a weight average molecular weight of 8,000. The obtained prepolymer was crystallized from acetone, and then the crystallized prepolymer was subjected to solid-state polymerization in a fluidized bed type solid-state polymerizer under nitrogen atmosphere at reaction temperatures of 220° C. or a little lower (the maximum reaction temperature was 220° C.), to thereby obtain a polycarbonate having a weight average molecular weight of 28,400. The obtained polycarbonate was allowed to stand in the polymerizer at 170° C. for about 6 hours under nitrogen atmosphere. The obtained aromatic polycarbonate was substantially free of chlorine values (the chlorine ion content was less than 0.1 ppm by weight and the chlorine atom content was less than 10 ppm by weight). The plurality of aromatic polycarbonate chains collectively contain, in the recurring units thereof, a divalent constituent aromatic group substituted with a methyl group in an amount of 0.00004 in terms of the molar ratio of the methyl group-substituted divalent constituent aromatic group relative to all divalent constituent aromatic groups in the recurring units of the plurality of aromatic polycarbonate chains. Further, the plurality of aromatic polycarbonate chains collectively have, in the plurality of terminal aryl carbonate groups thereof, a monovalent aromatic group substituted with a methyl group in an amount of 0.00005 in terms of the molar ratio of the methyl group-substituted monovalent aromatic group relative to all monovalent aromatic groups in the terminal aryl carbonate groups of the plurality of aromatic polycarbonate chains. 100 parts by weight of the polycarbonate and 0.001 part by weight of bis(nonylphenyl) hydrogen phosphate as a thermal stabilizer were mixed well by means of a Henschel mixer, to thereby obtain a mixtures. The resultant mixture was kneaded by means of an extruder to thereby obtain an aromatic polycarbonate composition and then the composition was pelletized. The resultant pellets were subjected to continuous molding, and various evaluations were made in accordance with the above-mentioned methods. Results are shown in Table 1.

EXAMPLE 9

An aromatic polycarbonate was produced in substantially the same manner as in Example 1. the aromatic polycarbonate, which was in the molten state upon the transesterification, was fed into a twin parallel screw extruder-having a liquid inlet and a vent. From the liquid inlet, an acetone solution of a mixture of 0.002 part by weight of bis(nonylphenyl) hydrogen phosphate and 0.02 part by weight of tris(2,4-di-tert-butylphenyl) phosphate [the amount (part by weight) of each of these compounds is expressed relative to 100 parts by weight of the fed aromatic polycarbonate] was fed to the extruder. During extrusion, acetone was withdrawn from the extruder through the vent. The obtained aromatic polycarbonate composition was subjected to continuous injection molding, and various evaluations were made in accordance with the above-mentioned methods. Results are shown in Table 1.

EXAMPLE 10

An aromatic polycarbonate was produced in substantially the same manner as in Example 1, except that a diphenyl carbonate product containing 2-methylphenyl phenyl carbonate in a concentration of 280 ppm by weight was employed. The obtained aromatic polycarbonate had a weight average molecular weight of 22,100. Further, the plurality of aromatic polycarbonate chains of the aromatic polycarbonate collectively have, in the plurality of terminal aryl carbonate groups thereof, a monovalent aromatic group substituted with a methyl group In an amount of 0.00016 in terms of the molar ratio of the methyl group-substituted monovalent aromatic group relative to all monovalent aromatic groups in the terminal aryl carbonate groups of the plurality of aromatic polycarbonate chains.

Using the obtained aromatic polycarbonate, an aromatic polycarbonate composition was obtained in substantially the same manner as in Example 1. The obtained aromatic polycarbonate composition was subjected to continuous molding, and various evaluations were made in accordance with the above-mentioned methods. Results are shown in Table 1.

EXAMPLE 11

An aromatic polycarbonate was obtained in substantially the same manner as in Example 1, except that a diphenyl carbonate product containing 2-methylphenyl phenyl carbonate in a concentration of 400 ppm by weight was employed. The obtained aromatic polycarbonate had a weight average molecular weight of 22,100. Further, the plurality of aromatic polycarbonate chains of the aromatic polycarbonate collectively had, in the plurality of terminal aryl carbonate groups thereof, a monovalent aromatic group substituted with a methyl group in an amount of 0.00023 in terms of the molar ratio of the methyl group-substituted monovalent aromatic group relative to all monovalent aromatic groups in the terminal aryl carbonate groups of the plurality of aromatic polycarbonate chains.

Using the obtained aromatic polycarbonate, an aromatic polycarbonate composition was obtained in substantially the same manner as in Example 1. The obtained aromatic polycarbonate composition was subjected to continuous molding, and various evaluations were made in accordance with the above-mentioned methods. Results are shown in Table 1.

TABLE 1

| Examples and Comparative examples | Weight average molecular weight of aromatic polycarbonate | Chlorine content | | Molar ratio of the methyl group-substituted divalent constituent aromatic group relative to all divalent constituent aromatic groups in the recurring units of the aromatic polycarbonate chains | Molar ratio of the methyl group-substituted monovalent aromatic group relative to all monovalent aromatic groups in the terminal aryl carbonate groups |
|---|---|---|---|---|---|
| | | Chlorine ion content (ppm) | Chlorine atom content (ppm) | | |
| Example 1 | 22,100 | <0.1 | <10 | 0.00004 | 0.00008 |
| Example 2 | 22,100 | <0.1 | <10 | 0.00002 | 0.00008 |
| Example 3 | 22,100 | <0.1 | <10 | 0.00006 | 0.00008 |
| Example 4 | 22,100 | <0.1 | <10 | 0.00008 | 0.00008 |
| Comparative Example 1 | 22,100 | <0.1 | <10 | 0.00012 | 0.00008 |
| Comparative Example 2 | 22,800 | 1.2 | 30 | 0.00008 | 0.00008 |

TABLE 1-continued

| Comparative Example 3 | 22,100 | <0.1 | <10 | 0.00004 | 0.00008 |
| --- | --- | --- | --- | --- | --- |
| Example 5 | 22,100 | <0.1 | <10 | 0.00004 | 0.00008 |
| Example 6 | 22,100 | <0.1 | <10 | 0.00004 | 0.00008 |
| Example 7 | 22,100 | <0.1 | <10 | 0.00004 | 0.00008 |
| Example 8 | 28,400 | <0.1 | <10 | 0.00003 | 0.00005 |
| Example 9 | 22,100 | <0.1 | <10 | 0.00004 | 0.00008 |
| Example 10 | 22,100 | <0.1 | <10 | 0.00004 | 0.00016 |
| Example 11 | 22,100 | <0.1 | <10 | 0.00004 | 0.00023 |

| | | | Properties of polycarbonate compsition after the interruption and subsequent restart of continuous molding | | |
| --- | --- | --- | --- | --- | --- |
| Examples and Comparative examples | Discoloration at high-temperature molding | | Number of molding shots in continuous molding before mold cleaning | Number of black shots | Number of molding shots before obtaining an excellent article |
| | Δb*30 | Δb*60 | | | |
| Example 1 | 0.8 | 1.9 | >600 | 2 | 6 |
| Example 2 | 0.6 | 1.4 | >600 | 1 | 5 |
| Example 3 | 0.9 | 2.1 | 561 | 5 | 10 |
| Example 4 | 1.0 | 2.4 | 513 | 10 | 13 |
| Comparative Example 1 | 1.8 | 4.1 | 215 | 23 | 26 |
| Comparative Example 2 | 3.0 | 9.0 | 72 | 43 | 48 |
| Comparative Example 3 | 2.1 | 4.4 | 200 | 26 | 30 |
| Example 5 | 0.7 | 1.7 | >600 | 1 | 3 |
| Example 6 | 0.9 | 2.2 | 530 | 4 | 8 |
| Example 7 | 0.9 | 2.1 | >600 | 3 | 7 |
| Example 8 | 0.6 | 1.3 | >600 | 1 | 4 |
| Example 9 | 0.7 | 1.6 | >600 | 2 | 5 |
| Example 10 | 1.0 | 2.3 | 520 | 7 | 10 |
| Example 11 | 1.5 | 3.0 | 380 | 18 | 18 |

INDUSTRIAL APPLICABILITY

The aromatic polycarbonate composition of the present invention has excellent thermal stability at molding. Specifically, the aromatic polycarbonate composition of the present invention is advantageous not only in that it is improved with respect to the suppression of discoloration at high-temperature molding, but also in that then it is continuously injection-molded and the continuous molding is interrupted and then restarted, the occurrence of unfavorable phenomena, such as deposition of black spots (carbonized material waste), and development of brown streaks, uneven color and the like, can be effectively suppressed. Therefore, the aromatic polycarbonate composition of the present invention can be advantageously used in various fields of applications of aromatic polycarbonates, such as the use thereof as injection molding materials.

We claim:

1. An aromatic polycarbonate composition comprising:
   (a) an aromatic polycarbonate comprising a plurality of aromatic polycarbonate chains, each comprising recurring units each independently represented by the following formula (1):

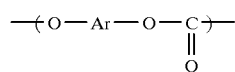

(1)

wherein Ar represents a divalent $C_6$–$C_{200}$ aromatic or pyridylene group comprising one or more divalent constituent $C_6$–$C_{30}$ aromatic or pyridylene groups which are each independently unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, wherein when the number of divalent constituent groups in said divalent aromatic or pyridylene group Ar is two or more, the divalent constituent aromatic or pyridylene groups are arranged in series on each aromatic polycarbonate chain and the mutually adjacent divalent constituent aromatic or pyridylene groups are connected to each other directly or through a bonding group, wherein said plurality of aromatic polycarbonate chains collectively contain, in said recurring units thereof, at least one divalent constituent $C_6$–$C_{30}$ aromatic or pyridylene group substituted with at least one methyl group in an amount of 0.0001 or less in terms of the molar ratio of the methyl group-substituted divalent $C_5$–$C_{30}$ constituent group or groups relative to all divalent $C_5$–$C_{30}$ constituent groups in said recurring units of said plurality of aromatic polycarbonate chains, said aromatic polycarbonate having a weight average molecular weight of from 1,000 to 300,000, each of said plurality of aromatic polycarbonate chains having terminal groups which are each independently selected from the group consisting of a terminal aryl carbonate group and a terminal hydroxyl group, provided that said plurality of aromatic polycarbonate chains collectively contain a plurality of terminal aryl carbonate groups, wherein each of said terminal aryl carbonate groups is independently represented by the following formula (2):

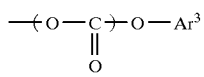
(2)

wherein Ar³ represents a monovalent $C_6$–$C_{200}$ aromatic or pyridyl group which is unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, and (b) a thermal stabilizer, said aromatic polycarbonate composition being substantially free of a chlorine-containing compound.

2. The aromatic polycarbonate composition according to claim 1, wherein said plurality of aromatic polycarbonate chains collectively have, in said plurality of terminal aryl carbonate groups thereof, at least one monovalent $C_6$–$C_{200}$ aromatic or pyridyl group substituted with at least one methyl group in an amount of 0.0002 or less in terms of the molar ratio of the methyl group-substituted monovalent group or groups relative to all monovalent groups in said plurality of terminal aryl carbonate groups of said plurality of aromatic polycarbonate chains.

3. The aromatic polycarbonate composition according to claim 1 or 2, wherein said thermal stabilizer (b) comprises a phosphorus thermal stabilizer.

4. The aromatic polycarbonate composition according to claim 3, wherein said phosphorus thermal stabilizer comprises at least one compound selected from the group consisting of a phosphorous monoester and a phosphorous diester.

5. The aromatic polycarbonate composition according to claim 4, wherein said at least one member selected from the group consisting of said phosphorous monoester and said phosphorous diester is present in an amount of from 0.0002 to 0.015 part by weight, relative to 100 parts by weight of said aromatic polycarbonate.

6. A method for producing an aromatic polycarbonate composition, comprising:

providing an aromatic polycarbonate produced by transesterification of an aromatic dihydroxy compound represented by the following formula (3):

(3)

wherein Ar⁴ represents a divalent $C_6$–$C_{200}$ aromatic or pyridylene group comprising one or more divalent constituent $C_6$–$C_{30}$ aromatic or pyridylene groups which are each independently unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, wherein when the number of divalent constituent groups in said divalent aromatic or pyridylene group Ar⁴ is two or more, the divalent constituent aromatic or pyridylene groups are arranged in series on each aromatic polycarbonate chain and the mutually adjacent divalent constituent aromatic or pyridylene groups are connected to each other directly or through a bonding group, with a diaryl carbonate represented by the following formula (4):

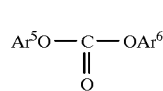
(4)

wherein each of Ar⁵ and Ar⁶ independently represents a monovalent $C_6$–$C_{200}$ aromatic or pyridyl group which is unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, said aromatic dihydroxy compound of the formula (3) being a mixture of an aromatic dihydroxy compound represented by the following formula (5):

(5)

wherein $Ar^{4x}$ represents a divalent $C_6$–$C_{200}$ aromatic or pyridylene group comprising one or more divalent constituent $C_6$–$C_{30}$ aromatic or pyridylene groups which are each independently unsubstituted or substituted with at least one substituent selected from the group consisting of a halogen atom, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, wherein when the number of divalent constituent groups in said divalent aromatic or pyridylene group $Ar^{4x}$ is two or more, the divalent constituent aromatic or pyridylene groups are arranged in series on each aromatic polycarbonate chain and the mutually adjacent divalent constituent aromatic or pyridylene groups are connected to each other directly or through a bonding group, and a methyl group-containing aromatic dihydroxy compound represented by the formula (6):

(6)

wherein $Ar^{4y}$ represents a divalent $C_7$–$C_{200}$ aromatic or substituted pyridylene group comprising one or more divalent constituent $C_6$–$C_{30}$ aromatic or pyridylene groups which are each independently unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, provided that said divalent aromatic or pyridylene group $Ar^{4y}$ contains at least one divalent constituent aromatic or pyridylene group substituted with at least one methyl group, wherein when the number of divalent constituent groups in said divalent aromatic or pyridylene group $Ar^{4y}$ is two or more, the divalent constituent aromatic or pyridylene groups are arranged in series on each aromatic polycarbonate chain and the mutually adjacent divalent constituent aromatic or pyridylene groups are connected to each other directly or through a bonding group, the content of said methyl group-containing aromatic dihydroxy compound of the formula (6) in said mixture being 200 ppm by weight or less; and adding a thermal stabilizer to said aromatic polycarbonate.

7. The method according to claim 6, wherein said diaryl carbonate represented by the formula (4) is a mixture of a diaryl carbonate represented by the following formula (7):

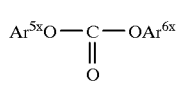
(7)

wherein each of $Ar^{5x}$ and $Ar^{6x}$ independently represents a monovalent $C_6$–$C_{200}$ aromatic or pyridyl group which is unsubstituted or substituted with at least one substituent selected from the group consisting of a halogen atom, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, and a methyl group-containing diaryl carbonate represented by the formula (8):

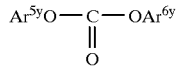
(8)

wherein each of $Ar^{5y}$ and $Ar^{6y}$ independently represents a monovalent $C_6$–$C_{200}$ aromatic or pyridyl group which is unsubstituted or substituted with at least one substituent selected from the group consisting of a halogen atom, a methyl group, a $C_2$–$C_{10}$ alkyl group, a $C_1$–$C_{10}$ alkoxy group, a $C_5$–$C_{10}$ cycloalkyl group, a $C_6$–$C_{30}$ aryl group and a $C_7$–$C_{31}$ aralkyl group, provided that at least one of said monovalent aromatic or pyridyl groups $Ar^{5y}$ and $Ar^{6y}$ is substituted with at least one methyl group, the content of said methyl group-containing diaryl carbonate of the formula (8) in said mixture being 300 ppm by weight or less.

8. The method according to claim 6 or 7, wherein said aromatic dihydroxy compound of the formula (5) is bisphenol A.

9. The method according to any one of claim 6 or 7, wherein said thermal stabilizer is added to said aromatic polycarbonate which is in the molten state upon said transesterification.

10. The method according to claim 8, wherein said thermal stabilizer is added to said aromatic polycarbonate which is in the molten state upon said transesterification.

11. A shaped article obtained from a material comprising an aromatic polycarbonate composition according to any one of claims 1, 2, 4 and 5.

12. A shaped article obtained from a material comprising an aromatic polycarbonate composition according to claim 3.

* * * * *